United States Patent [19]

Hagstrom et al.

[11] 3,963,872
[45] June 15, 1976

[54] NON-SYMMETRIC FOLDED FOUR-STAGE SWITCHING NETWORK

[75] Inventors: Kenneth Lavern Hagstrom; Sushil Gajendrarai Munshi, both of Galion, Ohio

[73] Assignee: North Electric Company, Galion, Ohio

[22] Filed: June 3, 1974

[21] Appl. No.: 475,962

[52] U.S. Cl. ................... 179/18 GF; 179/18 EA
[51] Int. Cl.[2] .................................. H04Q 3/52
[58] Field of Search ......... 179/18 EA, 18 E, 18 GF, 179/18 GE, 22

[56] References Cited
UNITED STATES PATENTS

| | | | |
|---|---|---|---|
| 3,491,211 | 1/1970 | Bininda et al. | 179/18 GE |
| 3,511,937 | 5/1970 | Bastian et al. | 179/18 GE |
| 3,618,024 | 11/1971 | Leger et al. | 340/166 R |
| 3,843,849 | 10/1974 | Jovic | 179/18 FG |

*Primary Examiner*—Thomas W. Brown
*Attorney, Agent, or Firm*—Johnson, Dienner, Emrich & Wagner

[57] ABSTRACT

A telephone central office switching system including a non-symmetric four stage (ABC+D) folded network and junctor circuits whereby a communication path is established from a calling terminal over the four stage network, through a junctor circuit, and back over the four stage network to a called terminal. The junctors and associated C and D stage switching arrays (matrices) are arranged in ordered pairs related to the two sides of the junctors. Further, the ordered pairs are arranged in ordered pair groups to facilitate searching. The crosspoints of the switching arrays (matrices) comprise C-MOS driven J-FETs (FET packs) controlled and supervised by integrated circuit latch packs which provide distributed control and memory.

19 Claims, 17 Drawing Figures

FIG. IB
NON-SYMMETRIC 4-STAGE FOLDED NETWORK
BLOCK DIAGRAM

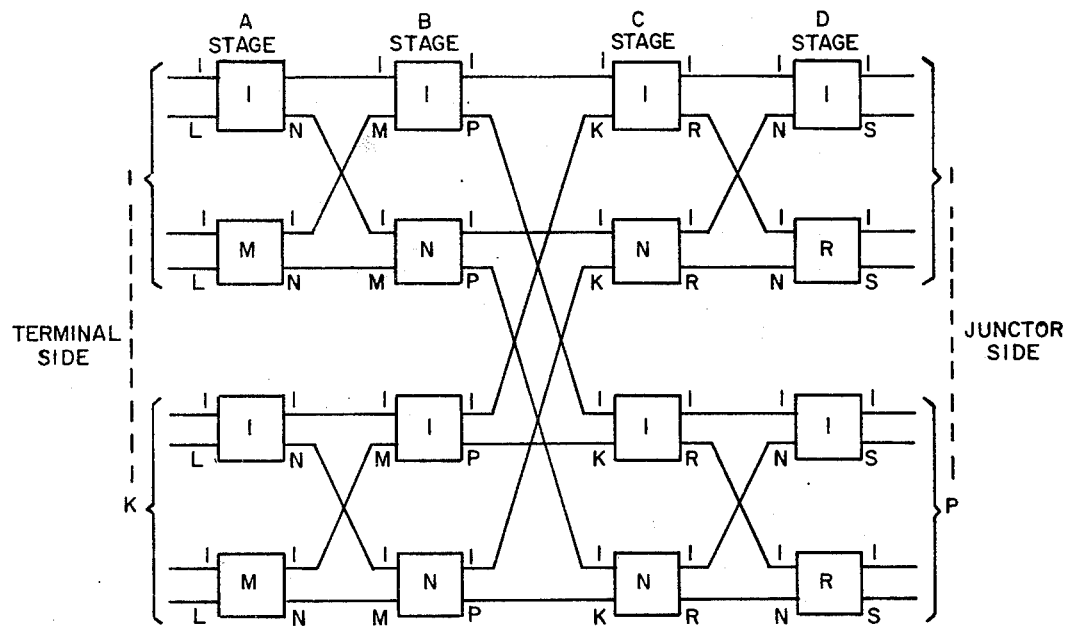
FIG. IA
(PRIOR ART)
SYMMETRIC 4-STAGE FOLDED NETWORK
BLOCK DIAGRAM
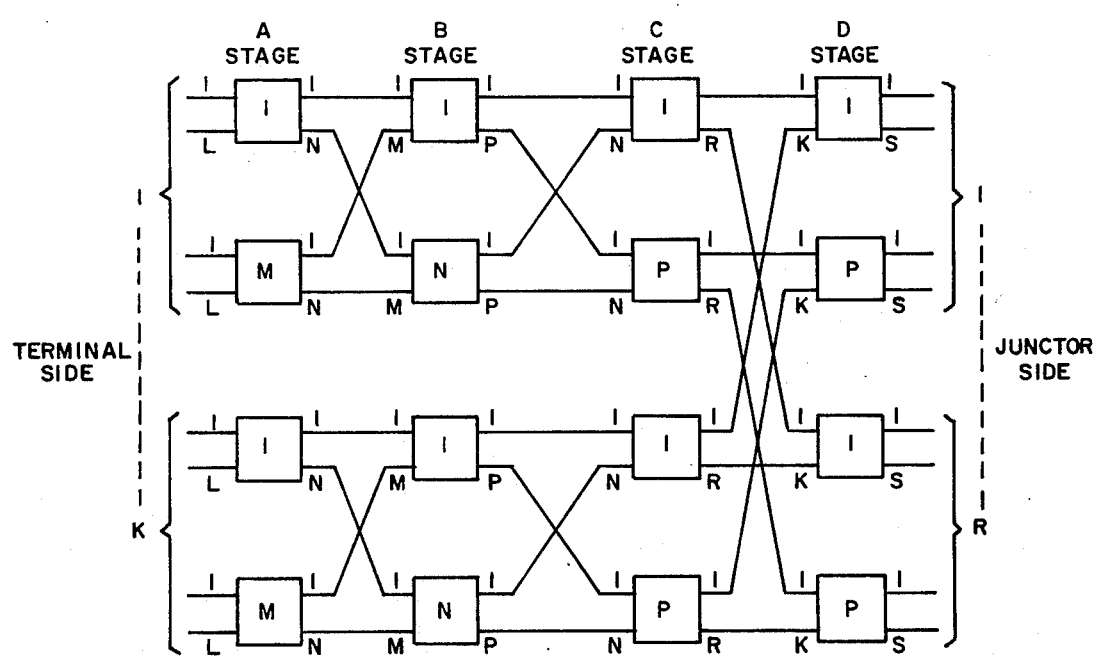
FIG. IB
NON-SYMMETRIC 4-STAGE FOLDED NETWORK
BLOCK DIAGRAM

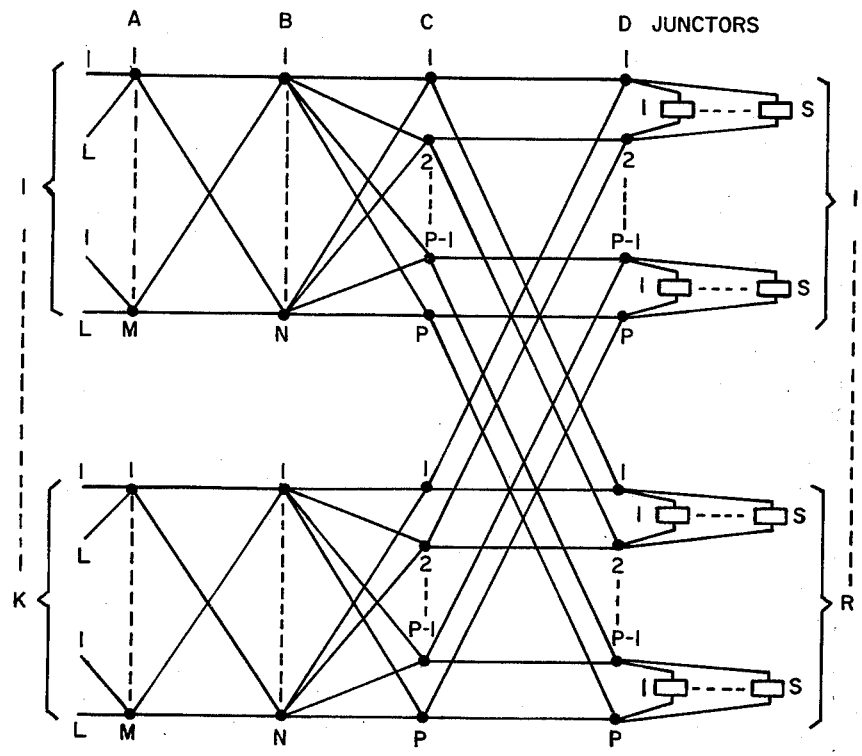
FIG. IC
ORDERED PAIRS
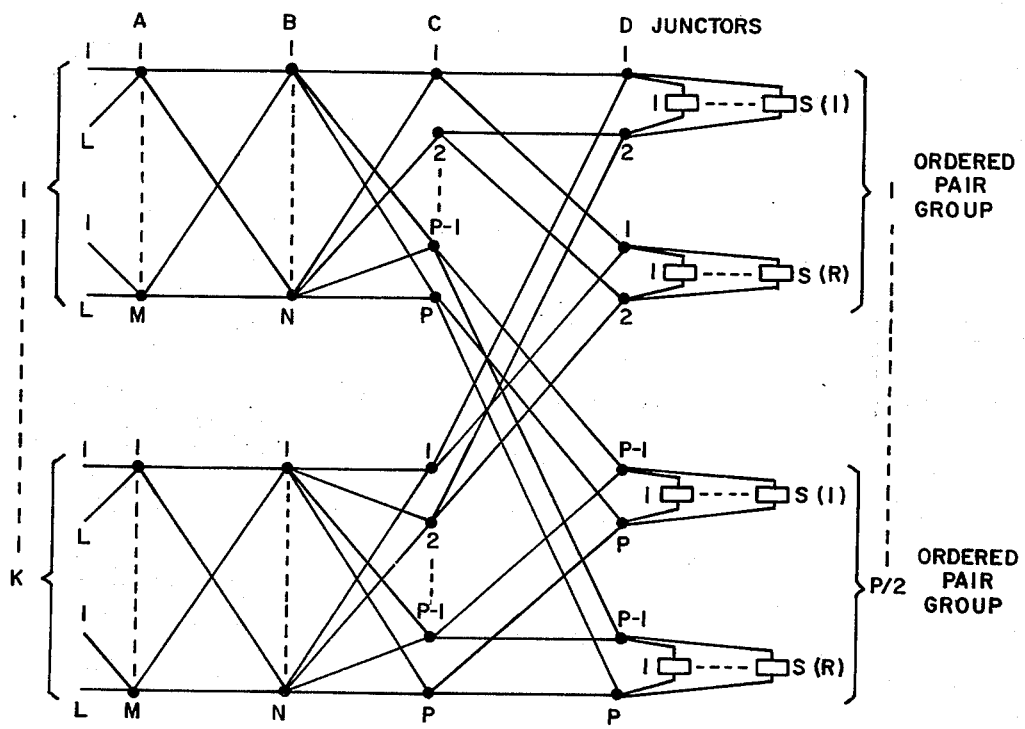
FIG. ID
REARRANGED ORDERED PAIRS

COINCIDENT IDLE LINK AND JUNCTOR SEARCH

COMMUNICATION SYSTEM BLOCK DIAGRAM

PATH SEARCHING FLOW CHART

MARKER FUNCTIONAL DIAGRAM

NON-SYMMETRIC FOLDED FOUR-STAGE SWITCHING NETWORK

GOVERNMENT CONTRACT

The invention herein claimed was made during the course of a subcontract with the Department of Defense.

BACKGROUND OF THE INVENTION

1. Field of the Invention

This invention relates to communication switching systems and more particularly to central office network configuration; and control and supervision therefor including search procedures for idle paths therein.

2. Description of the Prior Art

It is well known in switching system network arrangements that the probability of blocking can be reduced by the provision of additional switching stages or by increasing the number of attempts for a successful communication path. From the practical point of view, switching networks with an arbitrarily large number of switching stages require a very complex and expensive common control for path searching. Also, in actual practice, the number of attempts for a successful path in the nonfolded network is limited by the number of outgoing circuits provided. Additional limitation on the number of attempts is imposed when electromechanical markers are employed for path searching and real time expended per call is an important factor. Accordingly, a need exists for a switching network comprised of a practically manageable number of switching stages and capable of searching for all possible alternatives for a successful communication path.

Telecommunication networks are usually designed for ultimate maximum size. Initial networks are, in general, much smaller than the maximum size. When the network grows by the addition of lines or trunks, it is desirable to have minimum interruptions of service during the transition period. The conventional symmetric networks require a large amount of rearrangement. Therefore, a need also exists for a network which can grow from the initial size to the ultimate size in incremental steps on an in-service basis.

SUMMARY OF THE INVENTION

The four-wire space division switching network disclosed herein can be used in systems with unusually stringent transmission characteristics and space limitations. Such network possesses unique capabilities from the standpoint of expandability, modularity, traffic capacity, bandwidth, crosstalk rejection, crosspoint characteristics, and overall control problems.

By way of example, in the specific illustration herein, the network is readily expandable from approximately 64 terminals to 960 terminals, not including the overhead terminations required for register access, tone injection, or attendant access, however, 960 terminals should not be considered an upper limit. Notwithstanding such capability, the network is nevertheless modular enough to allow expansion in increments of 64 terminations while maintaining a constant traffic capacity capable of switching traffic in excess of 0.7 Erlangs per outside termination with a grade of service of 1 in a 1000.

In addition the system has a bandwidth of 110 kHz with an insertion loss of no more than ± 3.0 dB relative to the input level of 110 kHz while satisfying a crosstalk rejection criterion of approximately 90 dB at 110 kHz.

To meet certain conditions of size, weight, and environmental specifications, solid state crosspoints are required. Junction Field Effect transistors were selected to minimize crosstalk, insertion loss, harmonic distortion, and noise. However under certain less stringent requirements of size and weight, the crosspoints of the four-stage non-symmetric network can be implemented by electromechanical means.

More specifically, the novel telecommunication switching system described herein includes a folded, four-stage (3+1), non-symmetric crosspoint network. Lines, incoming trunks, outgoing trunks and two-way trunks are connected to the inlets of the first stage. Connection between two inlets at the first stage is via the four switching stages utilizing junctors provided at the outlets of the fourth stage. Thus a communication path between two inlets is over eight stages of selection, four from the originating inlet to a junctor and four from the junctor to the terminating inlet.

Inlets are divided into groups. Associated with each group is a three stage set of switching arrays comprising an ABC switching group. Each such switching group is subdivided into subgroups comprising a group of A stage matrices, a group of B stage matrices, and a group of C stage matrices. These A, B, and C matrices of an ABC switching group are interconnected in a conventional link network arrangement. Outlets from C matrices, called CD links, are then distributed over D matrices. Any inlet at the first stage can access any of the junctors connected to the outlets of D matrices. This novel distribution at the third stage distinguishes the network described from the conventional symmetric four stage networks.

In accordance with one feature of the invention, a switching network is provided where all possible paths are searched to establish a successful communication path between an inlet (terminal) requesting a connection to the desired inlet (terminal).

Another feature of the invention provides a unique path searching routine which eliminates search of non-usable sets and minimizes the search time per call.

In accordance with another feature of the invention a switching network is provided, utilizing any available hardware for crosspoints, where the system can gradually grow without interrupting service and also with considerably less additional cross connections than would be required in conventional symmetric four stages matrices.

Yet another feature consists of the provision of a distributed latch pack control with switching matrices to provide distributed monitoring and control so that memory control can be expanded as the network expands.

In accordance with one feature of the invention a switching network structure is provided in which for a given traffic load, the probability of blocking can be made arbitrarily small.

The configuration of the selected crosspoint devices (i.e., 2×2, 1×4, 4×4, etc. arrays) as well as their characteristics, (i.e., "on" resistance, "off" impedance, and parallel capacitance) influence the size and configuration of the switching arrays with which the network is constructed. Since every solid state device, regardless of the technology used in its manufacture, has significant series "on" resistance and finite parallel capacitance in both the "on" and "off" states, the switching array size with which a multi-staged network can be constructed to meet given crosstalk rejection and bandwidth criteria is limited. The limitation is due to two facts: (1) it can be easily shown that all crosspoints in a switching array contribute to some extent to crosstalk, and (2) each switching array appears as an R-C filter where the R is equal to the series "on" resistance and the C is equal to the sum of the parallel capacitance of each of the parallelled crosspoints.

The novel four-stage non-symmetric single entry "folded" network disclosed herein exhibits superior characteristics with regard to the number of crosspoints per terminal required for a given traffic level, overall efficiency with an ease of expansion, simplicity of control, and the fact that no switching arrays, which are large enough to limit the transmission bandwidth or degrade the crosstalk rejection are required for any network size within the system requirements.

BRIEF DESCRIPTION OF THE DRAWINGS

FIG. 1A is a block diagram of a prior art symmetric four-stage folded network, each stage comprising a plurality of groups of switching arrays (matrices);

FIG. 1B is a block diagram of a novel nonsymmetric four-stage folded network, each stage comprising a plurality of groups of switching arrays (matrices);

FIG. 1C is a diagram of the novel non-symmetric four-stage folded network and associated junctors in which switching arrays (matrices) are represented by dots and in which C and D stage switching arrays (matrices) and junctors are arranged in ordered pairs related to the two sides of the junctors;

FIG. 1D is a diagram similar to FIG. 1C but with the ordered pairs rearranged into ordered pair groups convenient for idle link and junctor searching;

FIGS. 2 and 3 are a more detailed block diagram communication system embodying the invention in which generally FIG. 2 portrays the non-symmetric four-stage network involving switching arrays (matrices) with their associated control and supervision units, junctors, and distributed latch pack controls and in which FIG. 3 illustrates common controls including processor means. (While communication paths are shown as single lines, it would be understood that each path comprises two transmitting conductors and two receiving conductors);

GENERAL DESCRIPTION

Figure 1E:
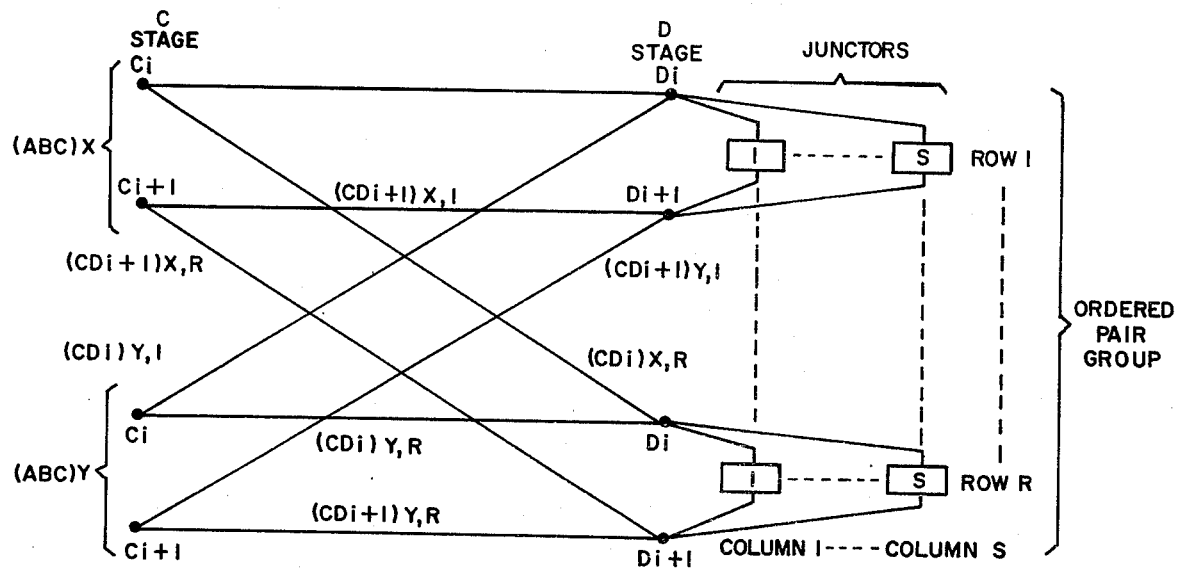
FIG. 1E is a diagram of an ordered pair group isolated from FIG. 1D to illustrate coincident idle link and junctor search procedures in setting up a communication path from a calling terminal designated $(ABC)_x$ to a called terminal $(ABC)_y$ in two A stage switching groups.

Referring to FIG. 1A, therein is shown a block diagram of a prior art symmetric four-stage (AB+CD) folded switching network. Contrasted with this, in FIG. 1B is shown a block diagram of non-symmetric four-stage (ABC+D) folded switching network.

Referring to FIG. 1B, on the terminal side, each of the A, B, and C stages comprises 1-K groups of switching arrays (matrices), whereas the D stage comprises 1-R groups of switching arrays (matrices) on the junctor side and provides full availability of the junctors to all of the terminals connected to the A-stage. Each A-stage group comprises 1-M matrices; each B stage group 1-N matrices; each C-stage group 1-P matrices; and each D-stage group 1-P matrices. Each A-stage matrix has connected thereto on the terminal side 1-L terminals to which lines or trunks may be connected. Each D-stage matrix has connected thereto 1-S junctors each of which may be a circuit or just a set of conductors. The first group of A, B and C stage matrices are interconnected as shown by links, there being an AB link from each A-stage matrix to each B-stage matrix in the group; thus 1-N such links from each A matrix. Similarly, there is a BC link from each B-stage matrix to each C-stage matrix in the group; thus 1-P such links from each C matrix. Each such group of A, B and C stage matrices is designated an ABC switching group. It should be noted that there are no interconnections between ABC stage switching groups.

Each D-stage group of matrices and the associated junctors is designated a DJ switching group.

Between the C and D stages are shown CD links, there being a CD link between each C-stage matrix and each DJ group, and conversely a CD link between each D-stage matrix and each ABC group; whereby the number of outputs (groups X matrices X outputs = KPR)
    K        P        R from the C group matrices equals the number of inputs to the D group matrices (groups X matrices X inputs = RPK).
    R        P        K Thus the interconnections between ABC and DJ groups are between the C and D stages, giving an ABC+D non-symmetric switching network. This contrasts with the symmetric network of FIG. 1A in which the interconnections between AB and CD switching groups are made by BC links between the B and C stages in a symmetric arrangement.

A significant advantage of the non-symmetric matrix is the ease with which it is expanded. Expansion entails the addition of ABC groups and increasing the size of the D-stage arrays. Note that only one stage, the D-stage, of an existing matrix is disturbed when the matrix is expanded. Expansion of a non-symmetric matrix is limited only by the practical limits to which the D-stage arrays can be expanded. Also, if the ratio of junctors to terminals is kept constant the traffic handling capacity of the matrix remains constant with expansion.

On the other hand, expansion of a symmetric four-stage matrix involves disturbing at least two stages of the existing matrix. Only one of the two possible methods of expanding a symmetric matrix results in constant traffic handling capacity with expansion. The other method, which entails adding four-stage groups, requires adjustments of all four stages with expansion in order to maintain constant traffic handling capacity.

Referring to FIG. 1C, which provides a link diagram, each switching matrix is illustrated as a dot for simplicity, and the C and D stage matrices and junctor groups are arranged as shown in ordered pairs related to the two sides of the junctors; whereby an ordered pair includes (1) a pair of D matrices, (2) a row of junctors connected between the D matrices of the pair, one side of which junctors is connected to one of the D matrices, and the other side of which junctors is connected to the other of the D matrices, and (3) all C-D links connected to said pair of D matrices.

Referring to FIG. 1D, as shown therein the ordered pairs are rearranged into ordered pair groups such that all ordered pairs having CD links connected to the same two C stage matrices in each line group are grouped together. Thus, in this figure the D-stage has been rearranged so that all links from the C-stage arrays 1 and 2 of all the ABC groups terminate on the same D-J group. The same is true for the C-stage arrays 3 and 4, 5 and 6, . . . , distributing the junctors in ordered pairs. There are R rows in every D-J group, each of which contains an ordered pair of D-stage arrays and S junctors. Each junctor in a row connects to both D-stage arrays. The distribution of the junctors is by fixed ordered pairs for several reasons. First, no traffic carrying advantage is gained by distributing the junctors in any other pattern. Second, distributing the junctors in fixed order pairs considerably simplifies the path search routines and allows blocks of possible paths to be examined simultaneously for the presence or absence of available paths, thus reducing the time required to perform a single path search and allowing multiple searches to be performed. Third, by distributing the junctor in sequential ordered pairs, i.e., (1,2) (3,4), (5,6), . . . (P-1,P), expansion of the traffic carrying capacity of the matrix is simplified since an ordered pair, e.g., (P+1,P+2), can be added without affecting the wiring and interconnecting cabling of the existing ordered pairs. This arrangement involving the non-symmetric pattern of the matrix in conjunction with the path search method, as will become clearer hereinafter, makes possible the capability of examining every possible path between two terminals before considering the connection blocked, there being $N^2PRS$ possible paths, each comprising at least one different segment if one includes different junctors in a row as different segments. The search method of the invention results in $N^2RS$ of the $N^2PRS$ possible paths being examined in one simultaneous search. A pair of coincident links is defined as CD links associated with line group(s) containing the calling and called terminals, which CD links, via a pair of D matrices are accessible to the respective sides of junctors connected to an ordered pair.

Referring now to FIG. 1E, therein is shown the DJ portion of an ordered pair group, and the CD links to the ABC switching group containing the calling party X and the CD links to the ABC switching group containing the called party Y. It should be noted that $ABC_X$ can equal $ABC_Y$, meaning that X and Y are two terminals in the same ABC group. During the path search procedure as will become clearer hereinafter, a coincident "snapshot" is first taken (i.e., a test is made simultaneously) of all idle junctors and coincident links of ordered pair groups to determine whether or not at least a pair of idle coincident links and at least *two* idle junctors associated therewith are available. If yes, a test is made to find the first row, of rows 1-R, containing idle junctors; and then a test is made of columns 1-S to find an idle junctor in that row. If the "snapshot" had proved negative, snapshots of other ordered pair groups in succession would have followed. If the "snapshot" of all ordered pair groups had proved negative, the "snapshots" would have been repeated trying to find an ordered pair group containing at least a pair of idle coincident links and at least one idle junctor associated therewith. In this figure an idle coincident CD link pair might comprise CD link (CDi) $x$, $l$ and (CDi+1) $y$, $l$ which might use junctor 1 of row 1 for example. Another idle coincident CD link pair might comprise CD link (CDi+1) X, R and (CDi) Y, R which might use junctor S of Row R, for example.

Figure 1F:
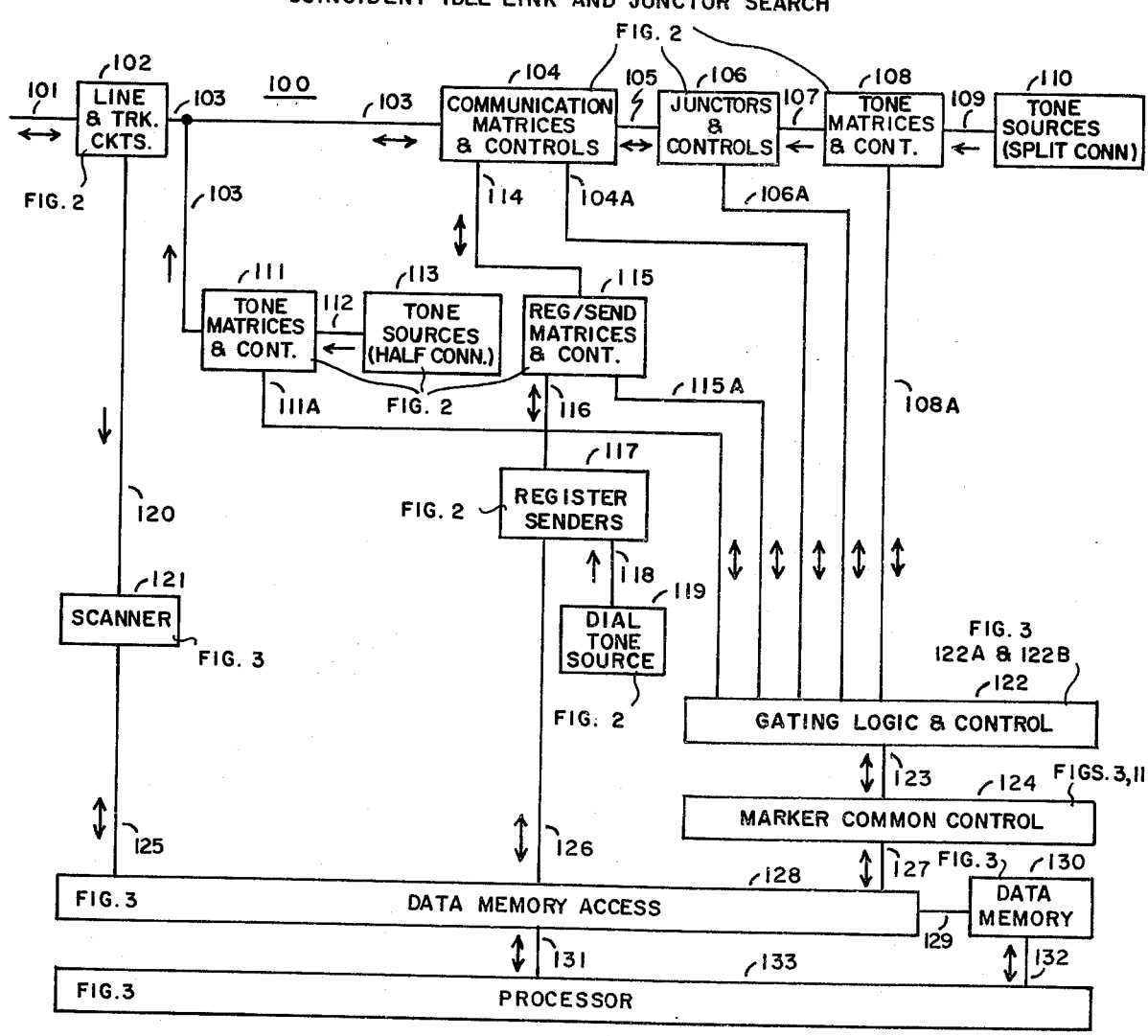
FIG. 1F is a high-level block diagram communication switching system embodying the invention.

FIG. 1F is a high level block diagram of an illustrative system embodying the invention, although the invention might be employed in various systems. The system of FIG. 1F is controlled by processor 133 in a "mail box" type of operation, whereby the processor at the appropriate times places information in the data memory 130 (the mail box) and takes information therefrom. Over memory and control path 131, the processor 133 controls the data memory access circuit 128 to bring information in over paths 125, 126, and 127 as required through the data memory access circuit 128 and path 129 which becomes stored in data memory 130; and over control path 131 controls the data memory access circuit 128 to export information from the data memory 130 over path 129, the data memory access circuit 128 and paths 125, 126, and 127, as required.

An off-hook condition received in circuit 102 is picked up by scanner 121; and via path 125, data memory access circuit 128 and 129 is stored in the data memory 130.

At the appropriate time, processor 133 via path 132 picks up the off-hook condition; and via path 131 causes data memory access circuit 128 to pass this information with the identity of the calling terminal and an idle register-sender from data memory 130 over paths 129 and 127 to the marker common control 124.

The marker common control via gating logic and control circuit 122 and paths 115A, 104A, and 106A, causes a connection to be set up from the calling terminal over path 103, the communication matrices of circuit 104, path 105, and a junctor of circuit 106, back over path 105, circuit 104, path 114, a register-sender matrix of the group represented by circuit 115 and path 116 to a register of the group represented by circuit 117, whereupon the calling terminal receives dial tone from dial tone source 119 over path 118.

The dialed number in the form of dial pulses or MF pulses is accumulated in the connected one of the registers of circuit 117.

At the appropriate time, the called number is fed over path 126, data memory access circuit 128, path 129 into memory cells of data memory 130. If outpulsing is necessary, the processor via the "mailbox" 130 and path 126 marks the connected one of the register-senders of circuit 117 to effect the outpulsing. The processor 133 via the "mailbox" 130 now conditions the marker 124 to effect disconnect between the calling terminal and the register-sender.

Thereafter the processor 133 via the marker and control paths 104A, 106A, and 108A sets up a ringing tone connection from tone sources (split connection) circuit 110 over path 109, tone matrices and control circuit 108, path 107, junctors in circuit 106, path 105, communication matrices of circuit 104, path 103, and line and trunk circuit 102 to the called terminal; and a ring back tone connection over a similar path to the calling terminal.

The called terminal answer is picked up by the scanner 121, enabling the processor 133 via the marker 124 to remove the tone paths and via the junctor of circuit 106 to complete communication paths over circuits 104 and 106 between calling and called terminals.

When one of the terminals (calling or called) goes on-hook, the on-hook signal is picked up by the scanner 121 enabling the processor 133 via the marker 124 to effect the disconnection of the calling and called terminals.

The processor thereupon via the marker, and path 111A effects the connection of busy tone from tone source 113 to the terminal which is still on hook until it goes off-hook, which condition is then picked up by the scanner 121, enabling the processor 133 via the marker 124 and path 111A to effect the disconnect of busy tone.

Figure 1G:
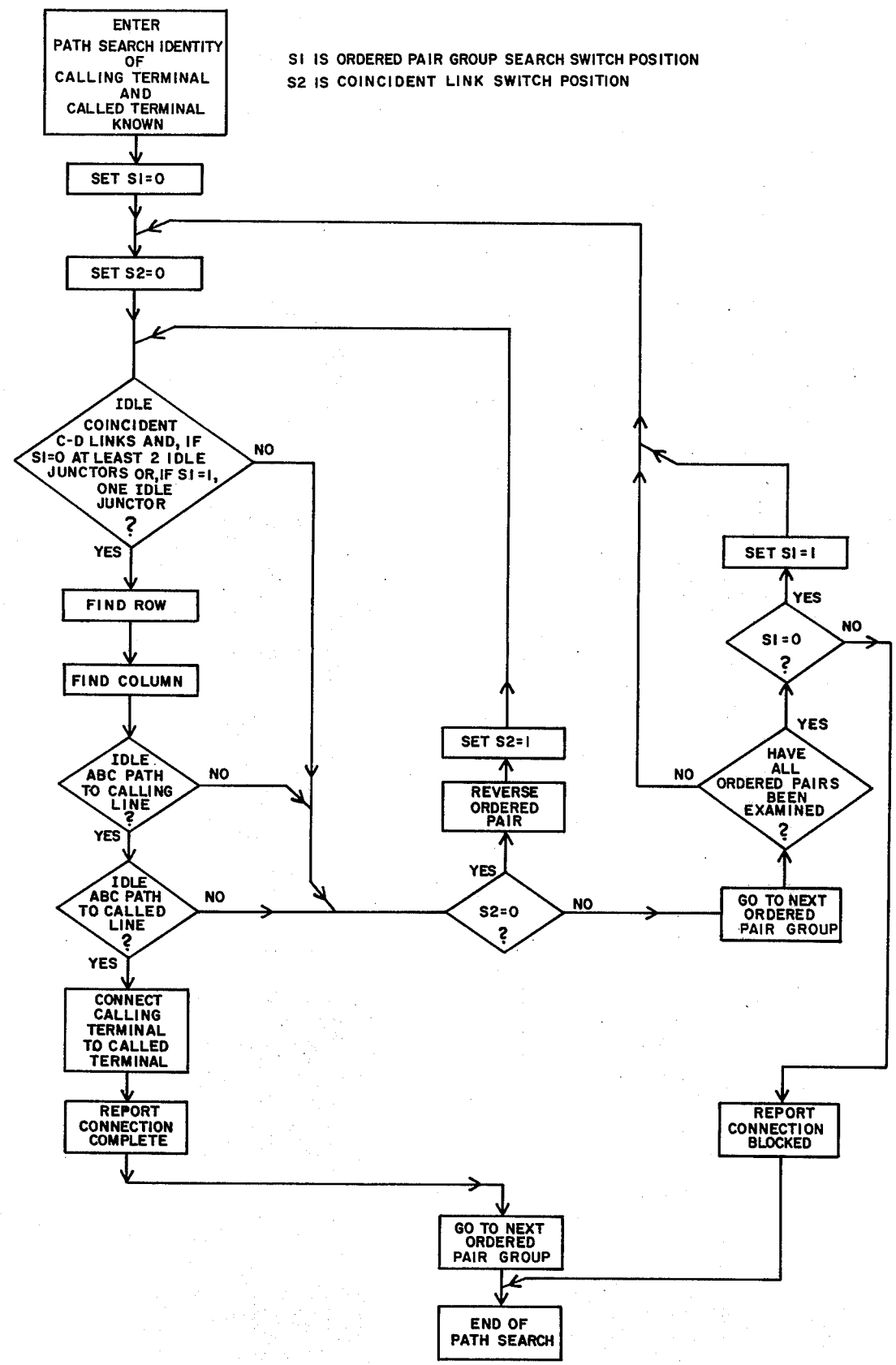
FIG. 1G is a flow chart illustrating path searching.

Reference is now made to the path searching flow chart of FIG. 1G as applied to the network diagram of FIG. 1D.

It should be observed that S1 in FIG. 1G refers to the S1 switch which is located in marker common control 124 (see FIGS. 1F and 3), which may be a flip-flop. Accordingly S1 = 0 refers to this switch in its first position marking the first search over ordered pair groups testing for at least one idle coincident pair of CD links and at least *two* idle junctors in a row. Also S1 = 1 refers to this switch in its second position marking the second search over ordered pair groups testing for at least one idle coincident pair of CD links and at least *one* idle junctor in a row.

Figure 10:
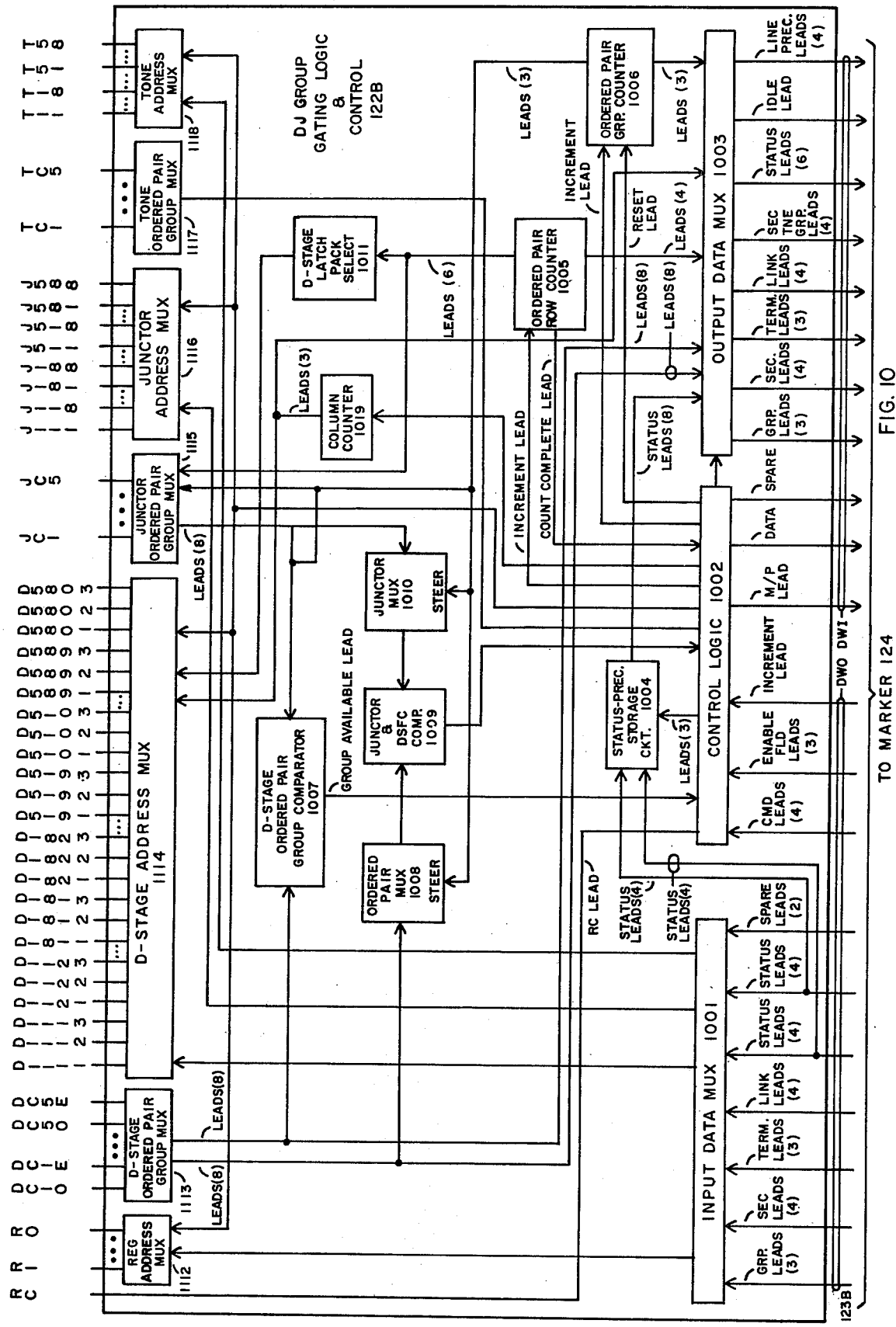
FIG. 10 is a more detailed block diagram of the DJ gating logic and control block of FIG. 3.

It should also be observed that S2 in FIG. 1G refers to the S2 switch which is located in the DJ group gating logic and control 122B (FIG. 3) and more specifically in D-stage address mux 1114 (FIG. 10). Accordingly S2 = 0 refers to this switch in its first position marking a search in which the calling CD link is accessible to the first side of a junctor and the called CD link is accessible to the second side of the same junctor. Also S2 = 1 refers to this switch in its second position marking a search in which the calling CD link is accessible to the second side of the junctor, and the called CD link to the first side of the same junctor.

Before entering into a detailed description of the flow chart of FIG. 1G, the following background is set forth.

The time required to complete a "worst-case" path search cycle in the implemented non-symmetric network is approximately 20 milliseconds. This cycle includes examining each of the P/2 D-J groups including both combinations of the ordered pair in each P/2 DJ group in turn to determine if, of the R pairs of links to the two ABC groups involved, coincident idle links with at least one idle junctor exist. Whenever this condition exists, each of the two ABC groups is examined to determine whether or not a complete path can be established. The longest path search results when it is necessary to examine all D-J groups and, for each, examine both ABC groups. Note that when a D-J group has been eliminated, $N^2RS$ paths of the $N^2PRS$ possible paths have been eliminated. In effect, P attempts to complete a connection through the matrix are made where each unsuccessful attempt eliminates $N^2RS$ paths. The effect of being able to examine all possible paths before considering a connection blocked has a dramatic effect on the probability of blocking for a given set of values for L, M, N, P, R and S. (Note that K has no effect on the blocking provided the ratio of junctors to terminals is kept constant with expansion).

As an example, if $L = M = N = R = S = 8, P = 10$, and $K = 10$, at 0.8E per terminal with a single path search attempt the probability of blocking, P(B), is equal to 0.24. If all ten attempts are made the P(B) equals $9.3 \times 10^{-4}$. A network configured in this manner would have 640 terminals and would contain 25,600 crosspoints. If only one path search attempt were allowed, a four-stage folded network with the same number of terminals designed to handle the same traffic with the same grade of service would contain approximately 47,000 crosspoints.

PATH SEARCHING

The path searching routine described hereat is with reference to FIG. 1G, and addresses to the sequences of tests performed by the marker to obtain an idle communication path comprised of AB, BC, and CD links together with an appropriate junctor which can connect the calling and the called terminal together. Request validation and busy-idle tests for the terminals are carried out prior to this search, and it is determined at this point that the request is valid and that the terminals involved are in idle state. Now, the following steps are taken in the order described to test and select an idle path.

Step 1

Enter the identities: ABC group number and A matrix identity within the ABC group of the calling and the called terminal.

Step 2

Set switch S2 to off position (S2=0). The status of S2 determines the order in which coincident CD links in an ordered pair are to be tested. Natural order (e.g. 1–2) if S2 is off (=0) and reversed order (e.g. 2–1); if S2 is on (=1).

Step 3

Set switch S1 to off position (S1=0). The status of S1 determines the condition concerning the minimum number of idle junctors in a junctor sub-group required before the set of idle coincident CD links and idle junctors is selected for the desired communication path. At least two idle junctors in a junctor sub-group must exist if S1 is off (S1=0) and only one idle junctor in a junctor sub-group is required if S1 is on (S1=1).

Step 4

Search for idle coincident CD link(s) and idle junctor(s) in the ordered pair group which is selected by the control. The search must satisfy the conditions set by switches S1 and S2. If the search is successful go to Step 5; otherwise go to Step 12.

Step 5

Select the lowest number junctor subgroup from those found in Step 4.

Step 6

Select one idle junctor from the idle junctors of the row selected in Step 5.

Step 7

Search for an idle path to the calling terminal via ABC stages from the CD link pair associated with the junctor sub-group selected in Step 5. If the search is successful go to Step 8; otherwise go to Step 12.

Step 8

Search for an idle path to the called terminal via ABC stages from the CD link pair associated with the junctor sub-group selected in Step 5. If the search is successful go to Step 9; otherwise go to Step 12.

Step 9

Operate appropriate crosspoints to establish the connection between the calling and called terminals.

Step 10

Report to the control that the connection is complete.

Step 11

Increase the ordered pair counter by one so that the search for the next call starts in a different ordered pair group. This is to achieve the uniform distribution of traffic. Continue with the next request.

Step 12

Check the status of switch S2. If it is off, set it to on, and go to Step 4; otherwise go to Step 13.

Step 13

Select the next ordered pair group.

Step 14

Test by means of 1007 if all the ordered pair groups are examined by checking the counter 1006 against the count from MUX 1113 indicating the number of ordered pair groups examined for each cycle of S1. If all ordered pair groups are examined go to Step 15; otherwise go to Step 3.

Step 15

Check the status of switch S1. If S1 is off, set it to on and go to Step 3; otherside go to Step 16.

Step 16

Report to the marker that the connection is blocked and instruct the marker to provide a proper signal back to the calling terminal. Continue with the next request.

DETAILED DESCRIPTION

Figure 2:
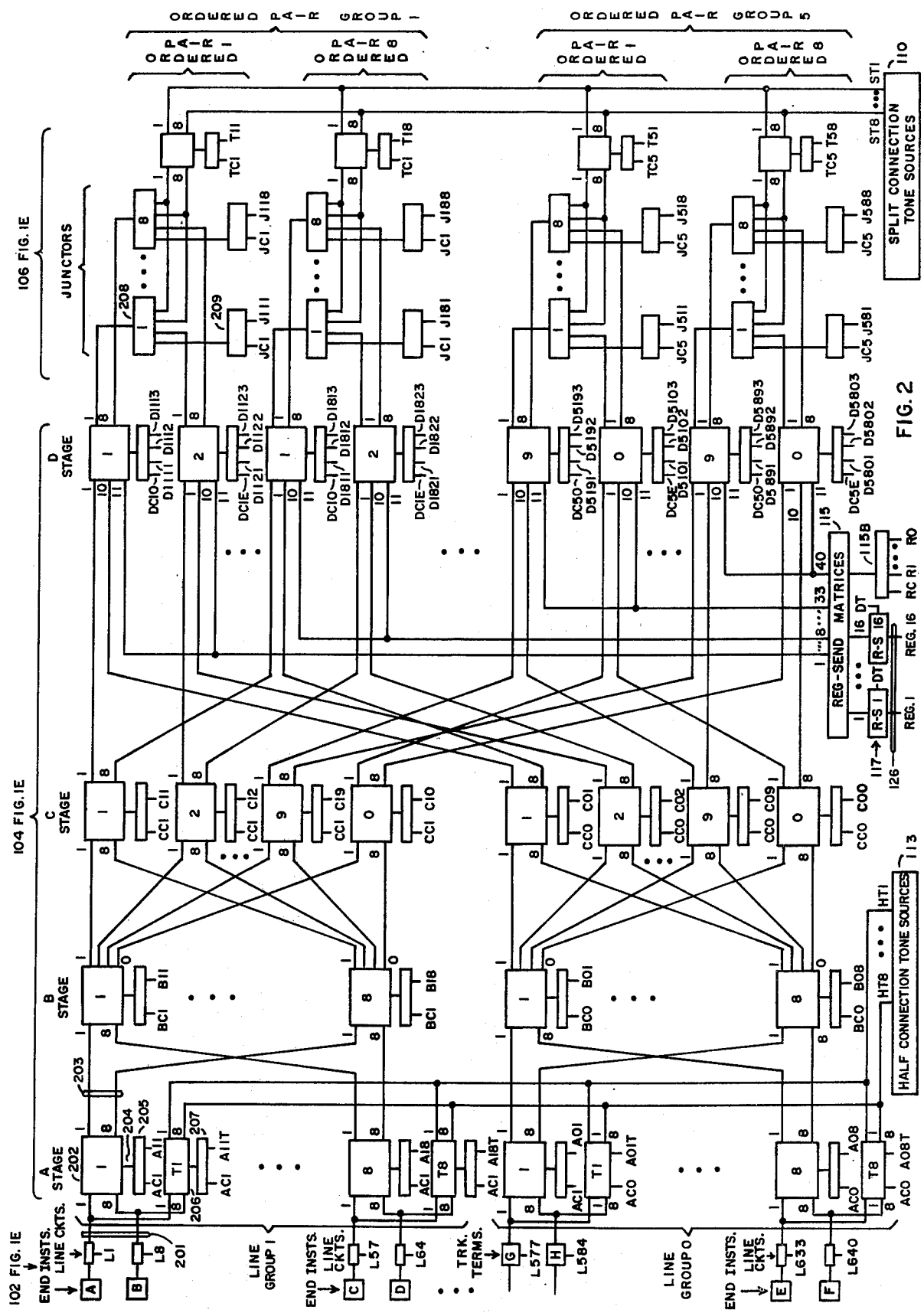
Figure 3:
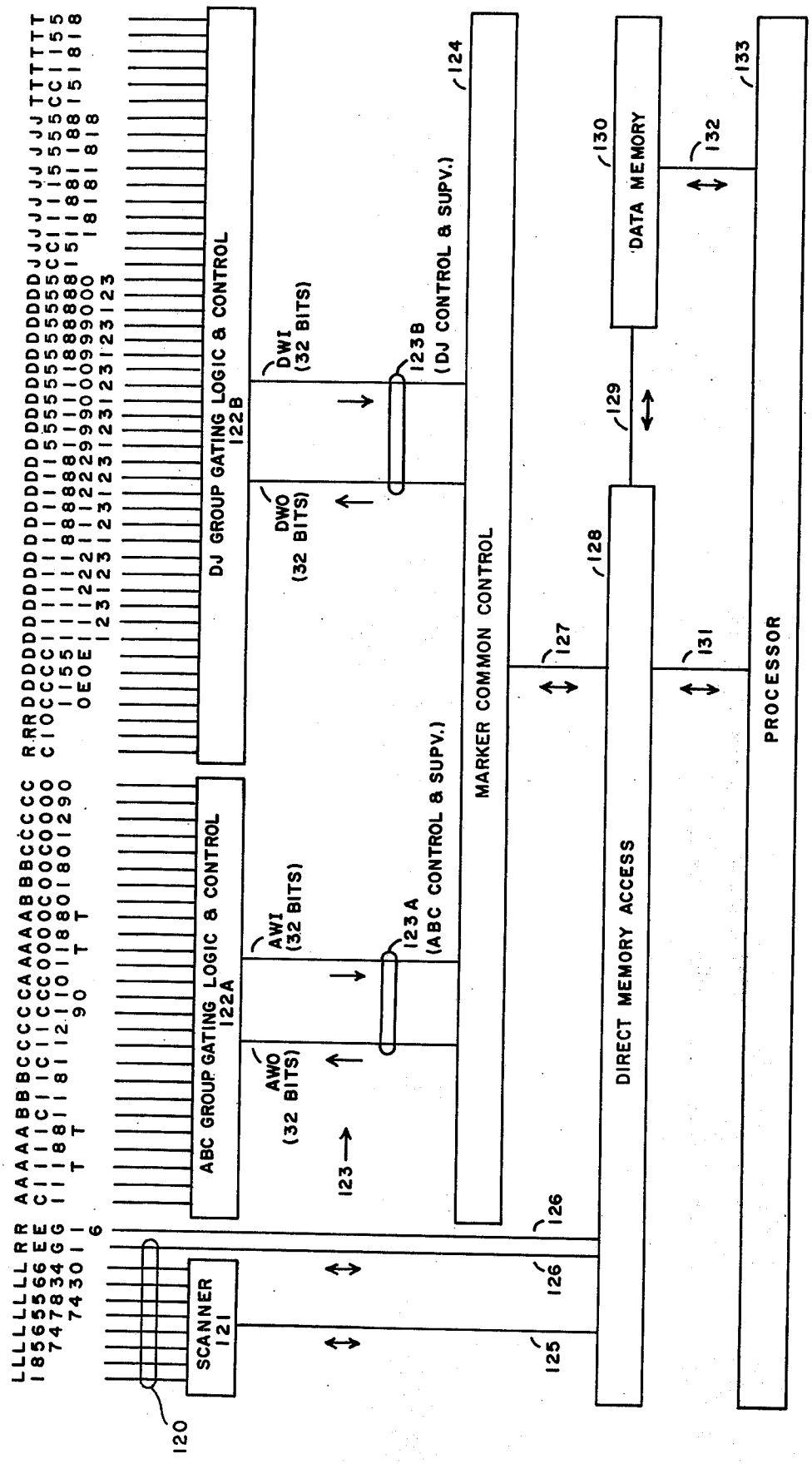

FIGS. 2 and 3 (i.e., with FIG. 2 placed above FIG. 3) provide a more detailed block diagram of the system. Preliminary to a detailed description thereof, the following observations are made.

In the example of FIGS. 2 and 3, $L = M = N = R = T = S = 8$, $P = 10$, $K = 10$ and $W = 16$ and $K'$, $S$ and $W$ vary as the network is expanded, $T$ referring to half connection tone matrices and full tone connecting matrices and $W$ to register-senders. The network provides for up to 16 register receiver/sender units, up to eight half connection tones and eight split connection tones. Half connection tones, such as line-busy, trunk-busy, idle trunk tone, error tone, etc., are tones which are sent to a subscriber or distant switch when no through connection is going to be made. These tones are injected in the A-stage because their holding time may be very long. Injecting these tones from the A-stage does not contribute to matrix congestion or blocking and allows them to remain under the control of the matrix control system.

Split connection tones, such as ring, ringback, answer tone, etc., are those tones sent to a subscriber or distant switch when a through connection is to be made. These tones are injected in the junctors and are also under the control of the matrix controller.

By making each increment of expansion, (i.e., the ABC groups) equal to 64 terminals, none of the array sizes within a group becomes larger than an 8 × 10 array, a size which is small enough to have negligible effects on the matrix bandwidth and crosstalk. Allowing a maximum expansion to 15 ABC groups limits the D-stage arrays to a maximum size of 16 × 12 (12 being the number of junctors), resulting again in a negligible effect on bandwidth and crosstalk.

The traffic handling capacity of the four-stage non-symmetric network remains constant with expansion because of the fact that the connect pattern remains the same for any connection between any two terminals regardless of the network size. This assumes that enough junctor circuits are added when the matrix is expanded to maintain a constant ratio of junctor circuits to terminals.

All crosspoints in the ABC groups are always utilized, leaving none wasted or left unused. The D-stage is the only stage of the matrix in which unused crosspoints can occur because each D-stage array is expanded in increments of 4. Maximum efficiency is achieved when 3, 5, 7, 10, or 15 ABC groups are equipped, as can be seen from Table 1 below. The values for the theoretical minimum number of crosspoints were derived by assuming that the D-stage arrays are expandable in increments of one and that the number of junctors equipped is always equal to or greater than half the number of terminals equipped.

TABLE 1

| | NETWORK EXPANSION INCREMENTS | | | |
|---|---|---|---|---|
| No. of ABC Groups | No. of Lines | No. of XPTS Per Line | Theoretical Minimum | Difference |
| 2 | 128 | 38.0 | 31.75 | 6.25 |
| 3 | 192 | 34.66 | 33 | 1.66 |
| 4 | 256 | 38.0 | 34.25 | 3.75 |

TABLE 1-continued

| | NETWORK EXPANSION INCREMENTS | | | |
|---|---|---|---|---|
| No. of ABC Groups | No. of Lines | No. of XPTS Per Line | Theoretical Minimum | Difference |
| 5 | 320 | 36.0 | 34 | 2.0 |
| 6 | 384 | 41.33 | 35.292 | 6.038 |
| 7 | 448 | 39.428 | 36.57 | 2.858 |
| 8 | 512 | 43.0 | 37.84 | 5.16 |
| 9 | 576 | 41.33 | 39.11 | 2.22 |
| 10 | 640 | 40.0 | 39.0 | 1.0 |
| 11 | 704 | 44.36 | 40.27 | 4.09 |
| 12 | 768 | 48.0 | 41.54 | 6.46 |
| 13 | 832 | 46.46 | 42.81 | 3.65 |
| 14 | 896 | 45.142 | 44.07 | 1.072 |
| 15 | 960 | 44.0 | 44.0 | 0.0 |

The number of crosspoints shown does not include the two-wire A-stage crosspoints for tone rejection nor the four-wire crosspoints of the register matrices.

The configuration of the network is capable of handling 0.8 Erlangs per terminal with a probability of blocking of $9.3 \times 10^{-4}$. Each matrix in the B and C stages of the ABC groups consists of a single printed wiring board which contains all crosspoint devices required and the latch pack control devices. Each A-stage matrix consists of a four-wire 8 × 8 matrix printed wiring board and one-half of a dual two-wire 8 × 8 matrix printed wiring board for A-stage tone injection.

The D-stage arrays are built up by paralleling four-wire quad 4 × 4 array printed wiring boards. Eight junctors are contained on a single printed wiring board.

Referring now to FIGS. 2 and 3, it should be observed that FIG. 2 as shown is a more detailed illustration based on FIG. 1D with specific values. Line group 1 is illustrated as having end instruments such as A, B, C, and D connected via associated line circuits to the terminals thereof, with respective line circuit scanning leads such as L1, L8, L57, and L64 extending as indicated from the line circuits to the scanner 121 of FIG. 3.

Line group 0 is illustrated as having trunk terminations, such as G and H, connected to the terminals of matrix 1 thereof, with respective scanning leads such as L577 and L584 extending as indicated from the trunk terminations to the scanner 121 of FIG. 3. Also line group 0 is illustrated as having end instruments, such as E and F, connected via associated line circuits to the terminals of matrix 8 thereof with respective line circuit scanning leads, such as L633 and L640, extending as indicated from the line circuits to the scanner 121 of FIG. 3. The terminals not shown may have lines or trunks connected thereto.

It should be observed that the eight terminals connected to each matrix, such as matrix 202 (which is an 8 × 8 four-wire matrix), are also multipled to a tone matrix, such as 206 (which is an 8 × 8 two wire matrix); but only the receiving two wires thereof. It will be observed that the eight connections to each tone matrix are multipled to the half connection tone sources 113.

Each of the A-stage matrices such as 202 are controlled and monitored by an associated control and supervision unit, such as 205, via a path such as 204.

Each of the A-stage tone matrices, such as 206, are controlled and monitored by an associated control and supervision unit, such as 207.

Paths AC1 of all of the control and supervision units of the A-stage line group 1 are multipled, as shown, to the ABC group gating logic and control circuit 122A of FIG. 3. Path AC1 comprises a plurality of leads, respective ones of which are in multiple. Each A-stage line group is similarly arranged.

Each control and supervision unit, such as 205, has an individual lead, such as lead A11 (A represents the stage; 1 represents the line group; and 1 represents the first matrix 202 which 205 controls) extending to circuit 122A. A further lead, such as the lead A11T (T designating the tone control and supervision unit which serves matrix 202) also extends to gating logic and control circuit 122A (FIG. 3).

Similarly each of the B-stage and C-stage matrices has its monitoring and controlling unit with multipled paths and individual lead to circuit 122A (FIG. 3) as shown.

Figure 4:
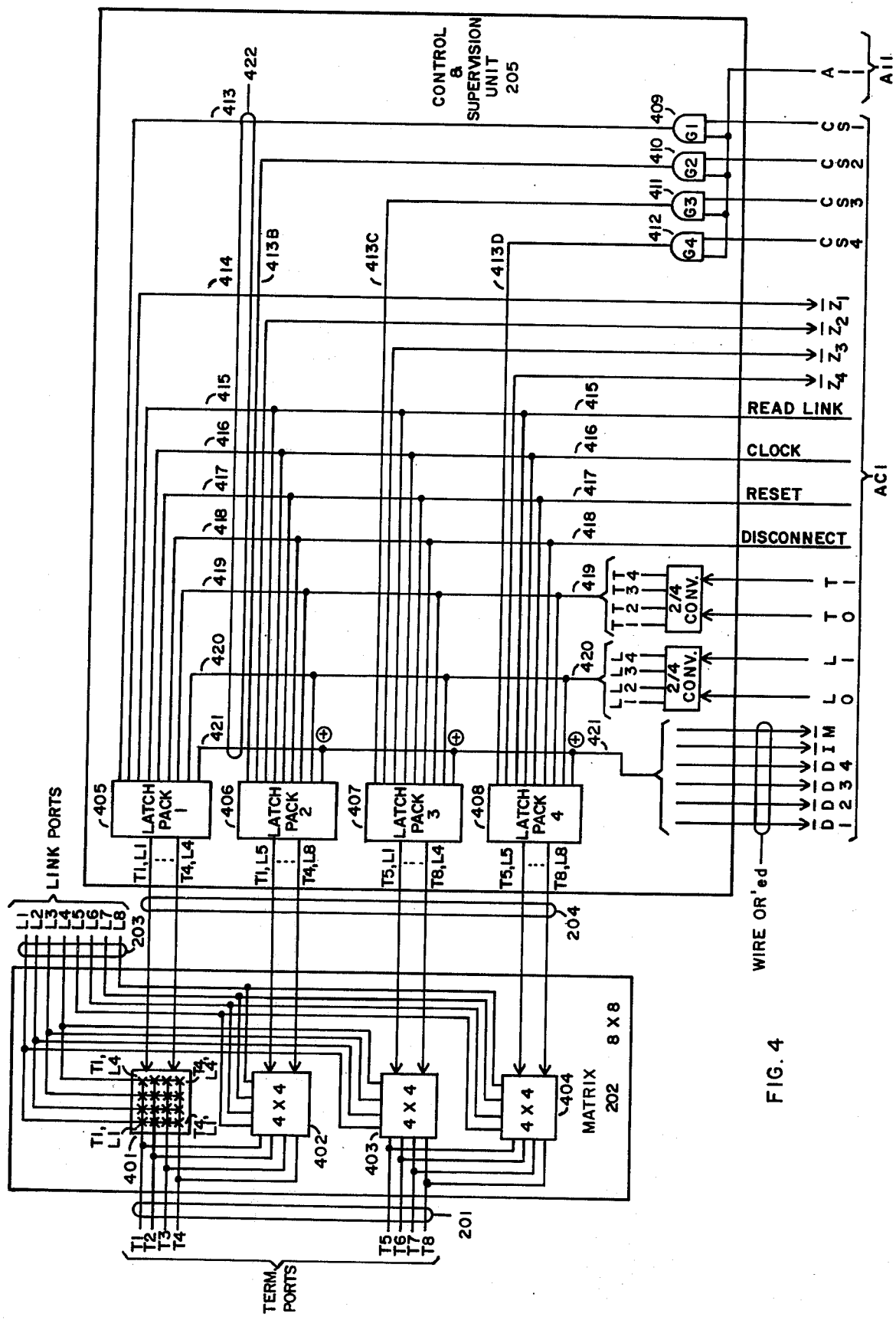
FIG. 4 provides a more detailed schematic and block diagram of an 8×8 switching array (matrix) (comprising four 4×4 switching arrays) and its associated control and supervision unit (containing four latch packs), both of which are mounted on the same card for rack assembly.

Referring now to FIG. 4, it will be understood as shown that each 8 × 8 matrix (64 crosspoints) of stages A, B, and C, such as matrix 202 of the A stage are made up of four 4 × 4 matrices; and that each control and supervision unit, such as unit 205 (and 207) contain four latch packs, each of which controls its associated 4 × 4 matrix over 16 leads. It should also be understood that communication paths through the four 4 × 4 matrices are four-wire paths with respect to matrices, such as 202; but are two-wire paths with respect to the four 4 × 4 matrices of tone matrices control circuits, such as 206.

Each matrix of the D-stage fundamentally is made up of three 4 × 8 matrices, each of which might be obtained, (see FIG. 4), by using two only of the first two 4 × 4 matrices, such as matrices 401 and 402, and the first two latch packs, such as latch pack 405 and 406; eliminating the third and fourth gates, such as 411 and 412.

These three matrices, in effect, make up a 12 × 8 matrix, in which the 8 DJ paths to junctors (at the right) are in multiple. However, only eleven of the twelve inputs (or outputs as the case may be) on the left are used with CD links connected to inputs 1–10 (on the left), for example, being connected to CD links; and with the eleventh terminal (on the left) extending to the register matrices circuit 115 with the eleventh terminal of each two consecutive 12 × 8 matrices being multipled as shown, giving 40 such leads to circuit 115. A twelth terminal is a spare not used in the example of FIG. 2.

Controlling and monitoring each D-stage 12 × 8 matrix there is shown in FIG. 2 a control and monitoring circuit CM directly thereunder. This control circuit CM contains the control and supervision unit for the three 4 × 8 matrices referred to above with the common path of each control unit multipled into a common path, such as DC10 (which contains a plurality of control leads) to DJ group gating logic and control circuit 122B of FIG. 3; but with the individual control leads of each control unit shown separately as leads D111, D112, and D113 to circuit 122B of FIG. 3. With reference to common path DC10, D refers to the D-stage, C means common, 1 refers to the ordered pair group 1, and 0 refers to "odd". (E refers to even). With reference to D1111, D refers to the D-stage, 1 refers to the ordered pair group 1, the next 1 refers to ordered pair 1, the next 1 refers to the 12 × 8 matrix number 1, and the last 1 refers to the first 4 × 8 matrix within the 12 × 8 matrix.

The register-sender matrices are shown as a circuit 115 for simplicity in FIG. 2 but comprise ten 8 × 8 matrices which give access to 16 registers (register-senders) as follows:

Matrix 1 from paths 1–8 to registers 1–8
Matrix 2 from paths 1–8 to registers 8–16
Matrix 3 from paths 9–16 to registers 1–8
Matrix 4 from paths 9–16 to registers 8–16
Matrix 5 from paths 17–24 to registers 1–8
Matrix 6 from paths 17–24 to registers 8–16
Matrix 7 from paths 25–32 to registers 1–8
Matrix 8 from paths 25–32 to registers 8–16
Matrix 9 from paths 33–40 to register 1–8
Matrix 10 from paths 33–40 to registers 8–16

Circuit 115B contains the control and supervision units similar to unit 205 (FIG. 4) for the matrices of circuit 115. As shown in FIGS. 2 and 3, path 126 of FIG. 1F comprises a plurality of individual paths from registers 1–16 to the data memory access circuit 128. Also, path 115A of FIG. 1F comprises the paths RC, R1 . . . R0 from control circuit 115B to circuit 122B.

Each of the eight paths of the 12 × 8 D matrices is connected to a junctor according to the pattern shown in FIG. 2. For example, path 1 of the first (uppermost in the drawing) D stage 12 × 8 matrix is shown connected to the first side of the first junctor circuit 208 of ordered pair 1 of ordered pair group 1. Also path 1 of the second D stage 12 × 8 matrix is shown connected to the second side of the first junctor circuit 208 of ordered pair 1 of ordered pair group 1. Path 8 of these same D stage matrices is shown similarly connected to the eighth junctor circuit of this ordered pair 1 row. Similarly for the paths 2 through 7 of these same D switches.

As previously defined, an "ordered pair" includes (1) a pair of D matrices (12 × 8) such as the two top matrices 1 and 2; (2) a row of junctors connected between the D matrices of the pair, such as junctors 1–8, of which junctor designated 208 is the first, one side of which junctors is connected to one of the D matrices, and the other side of which junctors is connected to the other of the D matrices; and (3) all CD links connected to said pair of D matrices which would include the ten connected to the left side of matrix 1 leading from the first C-stage matrix of each ABC line group; and the ten connected to the left side of matrix 2 leading from the second C-stage matrix of each ABC line group.

Each of the junctor circuits, such as 208, is shown as being controlled and monitored by a circuit, such as circuit 209. Circuit 209 can be considered for illustrative purposes to be similar to unit 205 of FIG. 4 without latch packs 2, 3, and 4 and without gates G1, G2, G3, and G4. Thus control and supervision circuit 209 controls and monitors junctor 208 with common path JC1 and individual path J111 leading to circuit 122B of FIG. 3. Similarly junctor 8 in this same row is controlled and monitored by its associated control and supervision circuit with common path JC1 and individual path J118 leading to circuit 122B of FIG. 3. It will be observed that common paths JC1 of the entire ordered pair group 1 are in multiple. Similarly common paths JC5 of ordered pair group 5 are in multiple.

Each of the eight junctors of a row, such as junctors 1–8 of the row in which circuit 208 is the first, are connected to an 8 × 8 four-wire matrix for access to split connection tone sources circuit 110, as shown, which matrix is controlled and monitored by an associated control and supervision block shown directly thereunder with common and individual paths, such as TC1 and T11 respectively to the DJ group gating logic and control circuit 122B of FIG. 3. It will be observed that common paths TC1 of ordered pair group 1 are in multiple to circuit 122B of FIG. 3; and that common paths TC5 of ordered pair groups 5 are in multiple to circuit 122B.

The half connection tone sources are applicable only to the called two wires of the calling connection and are as follows, for example:

| | |
|---|---|
| Busy Tones (line or trunk) | 2 tones |
| Lock-Out Tone (also used as idle trunk tones) (both lines and trunks) | 1 tone |
| Error Tone (to lines) | 1 tone |
| Release Tone (AC supervised phones) | 1 tone |
| Preempt Warning Tone (Released Parties) | 1 tone |
| Intercept Message (lines) | 1 message |

The split connection tone sources are applicable as follows, it being assumed in the present example that only eight of the following would be used in a given situation:

| Applicability Calling, Called or Both | Applicability to Line or Trunk | Tones |
|---|---|---|
| Calling or Called | Both | Stop tone - put ground on output |
| Called | Line | Ring tone |
| Calling | Both | Ringback tone |
| Called | Line | Ring tone (Precedence) |
| Calling | Both | Ringback (Precedence) |
| Same ( Calling or Called | Line | Recall response |
| Tone ( Called | Line | Ring Trip trip (Supervision end instrument) |
| Calling or Called | Both | Preempt Warning (Remaining parties) |
| Called | Line | 1600 Hz Ring-down |

Referring now to FIG. 3, it can be seen that this figure shows more detail in the control area than FIG. 1F. Path 123 of FIG. 1F is further illustrated in FIG. 3 to include path 123A and 123B. Furthermore, path 123A is shown to include a path designated AWO (A-stage word out) and a path designated AWI (A-stage word in). Over path AWO, a 32 bit word is transmitted from the marker common control circuit 124 to the ABC group gating logic and control circuit 122A. Over path AWI, a 32 bit word is transmitted from the circuit 122A to the circuit 124 for monitoring, reporting, or supervision purposes. Path 123B is shown to include similar paths DWO and DWI between circuit 124 and DJ group gating logic and control circuit 122B. Also, it can be seen that the path 120 of FIG. 1F is comprised of paths L1 . . . L640 of FIG. 3.

The A-stage matrix 202, path 204, and control and supervision unit 205 of FIG. 2 are shown in more detail in FIG. 4. More specifically, the 8 × 8 matrix 202 as shown in FIG. 4 is comprised of four 4 × 4 matrices and referred to hereinbefore. More specifically, terminals T1–T4 are multipled to 4 × 4 matrices 401 and 402. Via the crosspoints of matrix 401, terminals T1–T4 each become selectively connected to each of the link ports L1–L4. Via the crosspoints of matrix 402, terminals T1–T4 each become selectively connected to each of link ports L5–L8. Terminals T5–T8 are multipled to 4 × 4 matrices 403 and 404. Via the crosspoints of matrix 403, terminals T5–T8 each become selectively connected to each of link ports L1–L4. Via the crosspoints of matrix 404, terminals T5–T8 each become selectively connected to each of link ports L5–L8. For example, crosspoint T1, L1 may be selectively controlled to make the connection between terminal T1 and link port L1.

Crosspoints T1, L1 . . . T1, L4 . . . T4, L1 . . . T4, L4 of matrix 401 are selectively and individually controlled by dedicated latch pack 1 designated 405; matrix 402 by latch pack 2 designated 406; etc. Thus, as shown in more detail in FIG. 8, 16 control leads extend from latch pack 405 to matrix 401. In like manner, 16 control leads extend from each of latch packs 2, 3, and 4 to each of matrices 402, 403, and 404. The latch pack, such as 405, in one embodiment is a Motorola 117449 unit designed by North Electric Company.

Figure 5:
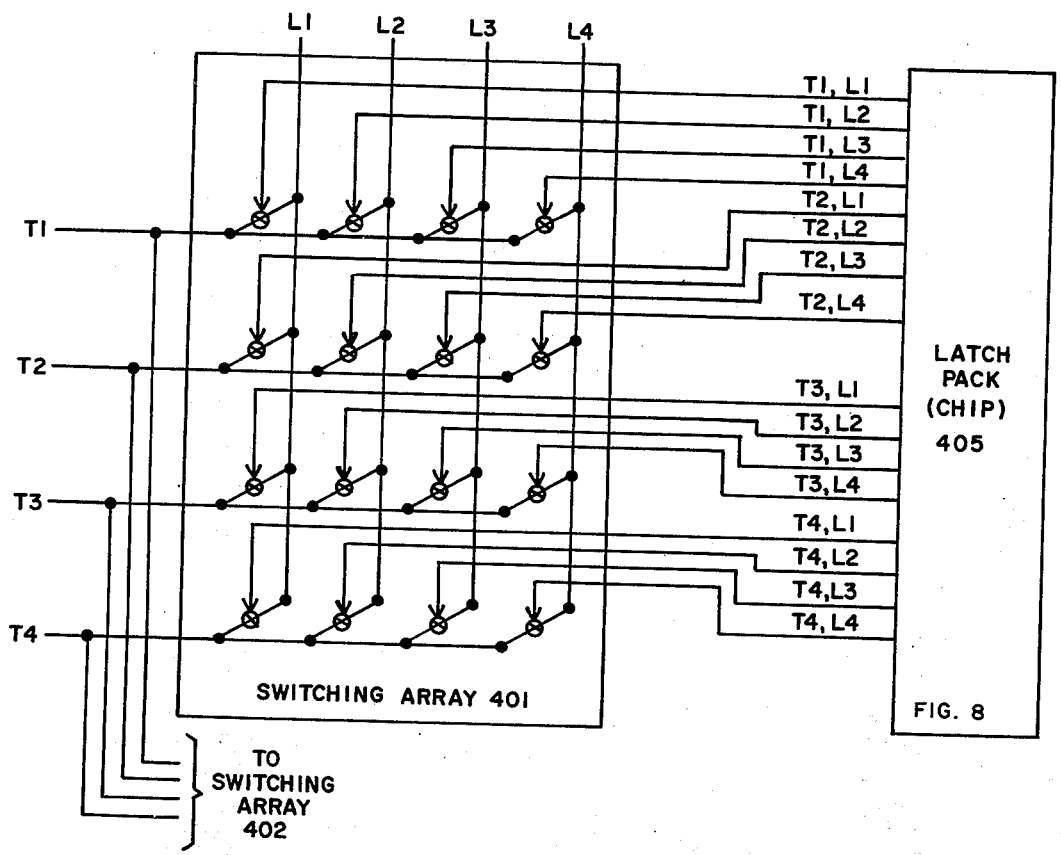
FIG. 5 is a schematic diagram of a 4×4 switching array referred to in FIG. 4 and connections between the same and its associated latch pack, a single communication path, such as T1 or L1, representing four conductors.

A more detailed showing of the 4 × 4 matrix 401 is shown in FIG. 5. Therein, each of the 16 control leads T1, L1 to T4, L4 are shown as operating respective gates to connect terminals with links. For example, control lead T1, L1 from latch pack 405 operates the gate which extends a connection from terminal T1 to link L1. Also this figure shows the multiple from terminals T1–T4 to switching array 402. Although terminals and links and connections are shown as single path in FIG. 5, actually there are four leads in each path.

Figure 6:
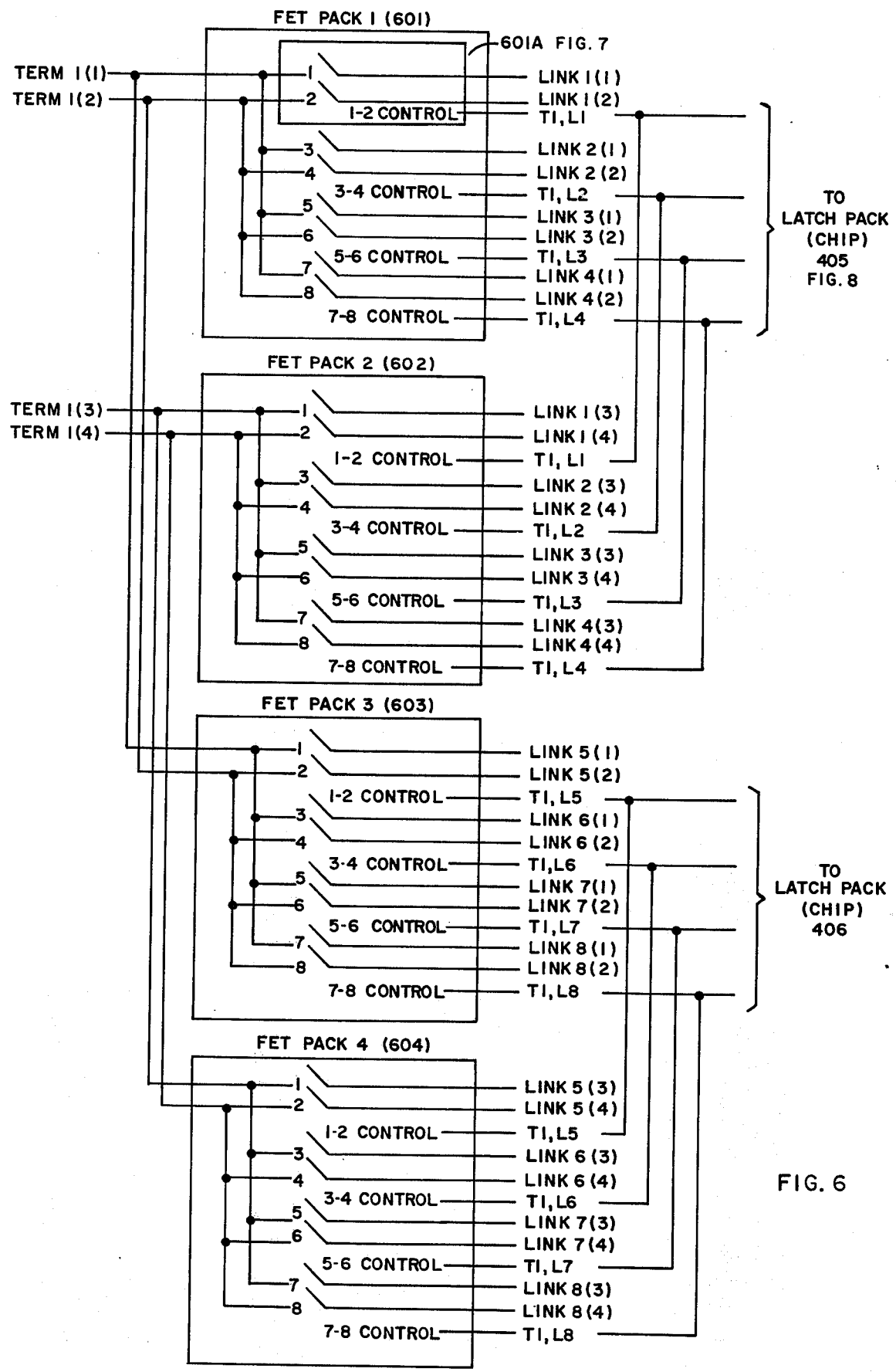
FIG. 6 is a schematic illustrating connections of the four conductors of a terminal such as T1 to four links such as L1–L8 via FET-packs, each FET-pack including four sections, each section containing two J-FETS and their associated controls.

With reference now to FIG. 6, the four leads of terminal 1 and the connections from terminal 1 through the switching array to links L1–L8 are schematically shown. Therein it will be seen that leads 1 and 2 (transmitting leads) are connected in multiple to FET pack 1 designated 601 and FET pack 3, designated 603; and that leads 3 and 4 (receiving leads) are connected in multiple to FET pack 2, designated 602 and FET pack 4, designated 604.

Within each FET pack are four sections, the first section of FET pack 1 (601) being designated 601A. Terminals 1 and 2 are multipled within FET pack 601 to each of the four sections. Within each section, as schematically shown, are two switches and associated control, the switches of section 1 being numbered 1 and 2, and the control therefor being designated 1-2 control which arrangement effects the closure and opening of the switches as required for space division communication paths. Thus switch 1 controls the connection of lead 1 of terminal 1 to lead 1 of link 1; switch 2 controls the connection of lead 2 of terminal 1 to lead 2 of link 1. The 1-2 control of the section 601 is shown as being connected to the T1, L1 path from latch pack 405. It will be seen that the T1, L1 control lead from latch pack 405 also extends to the first section of FET pack 602 for controlling the connection of leads 3 and 4 of terminal 1 to leads 3 and 4 of link 1. In the half connection tone matrices, FET packs 2 and 4 would not be equipped.

Figure 7:
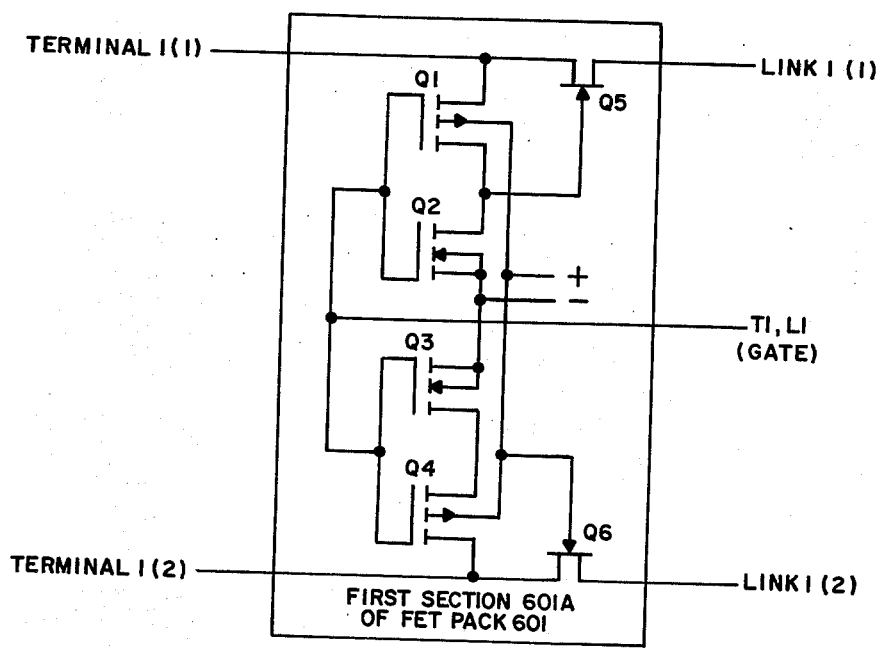
FIG. 7 is a schematic representation of one of the J-FET sections including two J-FETS, each of which has shown its C-MOS control, both C-MOS controls having a common gate conductor such as T1, L1 (gate)

Referring now to FIG. 7, the first section of 601A of FET pack 601 is shown in more detail to comprise two J-FETS Q5 and Q6 each driven by C-MOS drivers having a common gate lead T1, L1. The C-MOS driver which controls J-FET Q5 comprises Q1 and Q2. The C-MOS driver which controls J-FET Q6 comprises Q3 and Q4. The FET pack is an integrated circuit packaged with pins for insertion into a printed circuit board and measures approximately 0.785 (length) × 0.295 (width) × 0.2 in. (height).

CROSSPOINT

The selection of the junction-isolated junction field effect transistor, J-FET, as the crosspoint device for the matrix was the result of an exhaustive in-depth study of solid-state switching devices that considered switching diodes, PNPN diodes, SCR diodes, bipolar transistors and field effect transistors as candidate crosspoint devices. In the evaluation of the candidate devices it was necessary not only to consider the intrinsic parameters of the device but also the control mechanism and its intended application (i.e., an expandable multiple-stage matrix with stringent transmission requirements). The multiple stage matrix has an inherent design subtlety in the control of the crosspoint switch, because the control, maintainability, and fault isolation problems escalate in a multi-stage matrix due to the cascading proliferation of available transmission paths. For this reason, positive control of the device in the "ON" and "OFF" states and the capacity for crosspoint interrogation on a routine basis became a primary evaluation criterion. In order to avoid compromising communications through inadvertent double connections, dynamic, on-line fault detection required a control mechanism capable of providing the exact state of every set of contacts in the matrix. The transmission characteristics including the state-of-the-art performance requirements for wideband transmission with crosstalk rejection of 90 dB, were extremely demanding. Other transmission requirements including insertion loss, harmonic distortion, delay distortion, idle channel noise, and impulse noise presented other impacting variables in the crosspoint device selection. The critical crosspoint characteristics which were evaluated are, positive control "ON", positive control "OFF", isolation of control path from transmission path, isolation of power supply from transmission path, resistance R (ON), and power dissipation.

The J-FET device was found to be the only candidate device capable of satisfying all the specified stringent transmission requirements. The maximum coupling mechanism from the transmission path to either the control or supply is two pico farads or less which represents more than sufficient isolation. Positive control of the "ON" and "OFF" states is integral in the device design and no external mechanism exists under normal operating conditions that can change the state of the device. R (ON), although higher than that for the switching diode, PNPN, SCR, or bi-polar devices, does not degrade matrix performance for several reaons. First R (ON) is constant and does not vary with the AC signal. Second, in a four-wire matrix, buffering techniques can negate the effect of series resistance. The worst-case power dissipation per four-wire crosspoint including the power dissipated by the CMOS control mechanism, the latch pack described below, is approximately 60 microwatts, yielding a matrix with negligible power requirements.

The J-FET crosspoint pack consists of a single integrated circuit chip containing eight junction-isolated J-FET's and eight CMOS drivers arranged as a two-wire 1 × 4 array in a 16-pin dual-in-line package.

A brief description of the equivalent circuit begins by stating that the equivalent circuits approximate the equivalent circuits for any electrical switch when the assumption is made that the bias voltages appear as AC grounds. A single J-FET with CMOS driver, is one-half of a balanced transmission path (i.e., one-half of a two-pole single-throw switch). In the "ON" FET equivalent circuit, the 50 ohm resistance between the source and drain is the series resistance. Two 6 pico farad capacitances, one from the source and one from the drain to the gate, represent the junction capacitances between the J-FET and CMOS drivers. The two pico farad capacitances represent the source to the substrate and drain to substrate capacitances that couple the signal to the substrate (negative supply voltage). These capacitances directly affect the transmission bandwidth since they complete an RC network in a multi-stage array. The values of the capacitances and series resistance are significantly below the impedance levels that would cause significant degradation of transmission performance. At the substrate, a voltage is developed which is cancelled by a similar out-of-phase voltage from the opposite half of the balanced transmission path. Every pair of J-FET crosspoints is on the same chip because of this critical performance requirement. The CMOS driver consists of a P-channel and N-channel enhanced mode MOS-FET. The 10K resistance from source to the gate control represents the P-MOS device in the "ON" state and acts as a voltage clamp between the source and the drain of the J-FET when "ON". This design assures that in the "ON" state the series resistance remains constant with the AC signal applied to either the source or the drain, thereby minimizing second order harmonic distortion and transmission path imbalance (a source of crosstalk).

In the "OFF" FET, the equivalent circuit is identical to the "ON" FET circuit except in two areas. With the J-FET in the "OFF" state, the source to drain impedance appears as a 2 pico farad capacitance in parallel with a series "OFF" resistance which is essentially the equivalent resistance of a 6V source to drain voltge divided by the leakage current and is in excess of $10^8$ ohms. This impedance is not sufficient to degrade transmission performance of adjacent "ON" devices. In an "OFF" state the N-channel MOS-FET is turned on and appears as a 1K ohm resistance from the gate of the J-FET to the substrate which is at a negative potential relative to AC ground. This results in a source gate voltage that assures, with an adequate safety factor that the J-FET, with a 6V pinch-off voltage, will remain in the "OFF" stage.

The transmission path through the J-FET crosspoint is from source to drain or from drain to source since the devices are designed to be bilateral relative to transmission characteristics. The J-FET's are biased −12V DC on the substrate (body) and +3V DC as the B+ returns for the P-MOS portion of the CMOS driver circuit. The J-FET's are designed for a pinch-off voltage no less than 6V which, with the base voltages selected, enables the devices to pass a 6V peak-to-peak AC signal without clipping, introducing distortion, or disturbing the state of any other J-FET in the array.

The process used in manufacturing these crosspoint devices combines the technologies of junction-FET and CMOS on a single substrate.

Referring now to FIG. 4, the control and supervision unit 205 is selected by a signal over path A11 which is unique to unit 205. This signal is one input to each of the gates G1 (409), G2 (410), G3 (411), and G4 (412). It will be observed that the latch packs 405, 406, 407, and 408 are individually connected to the output of gates G1 (409), G2 (410), G3 (411), and G4 (412) respectively. Accordingly, if unit 205 selection signal is on lead A11, latch pack 1 (chip 1) will be selected if the selection signal is on common AC1 path lead CS1 (chip select 1); latch pack 2 if the selection signal is on CS2; etc. Signals selectively on two leads T0 and T1 in path AC1 to a 2/4 converter, enable this converter to selectively place the selection signal on any one of the terminal leads T1–T4 which are multiplied to all four latch packs, marking the latch packs as to the predetermined terminal. Two other leads L0 and L1, in path AC1, to a 2/4 converter enable this converter to selectively place the selection signal on any one of the link leads L1-L4 which are multiplied to all four latch packs, marking the latch packs as to the predetermined link. Four leads in path AC1, "Read Link", "Clock", "Reset", and "Disconnect" are multiplied to all four latch packs. Four leads $\overline{Z}_1$, $\overline{Z}_2$, $\overline{Z}_3$, and $\overline{Z}_4$, are monitoring leads in path AC1 individually from latch packs 1, 2, 3, and 4 respectively. Four data leads $\overline{D1}$, $\overline{D2}$, $\overline{D3}$, and $\overline{D4}$ and two reporting leads $\overline{I}$ and $\overline{M}$ in path AC1 are mulipled to all latch packs. The leads 413-420 and path 421 on the right side of latch pack 205 are collectively designated 422 as shown.

Figure 8:
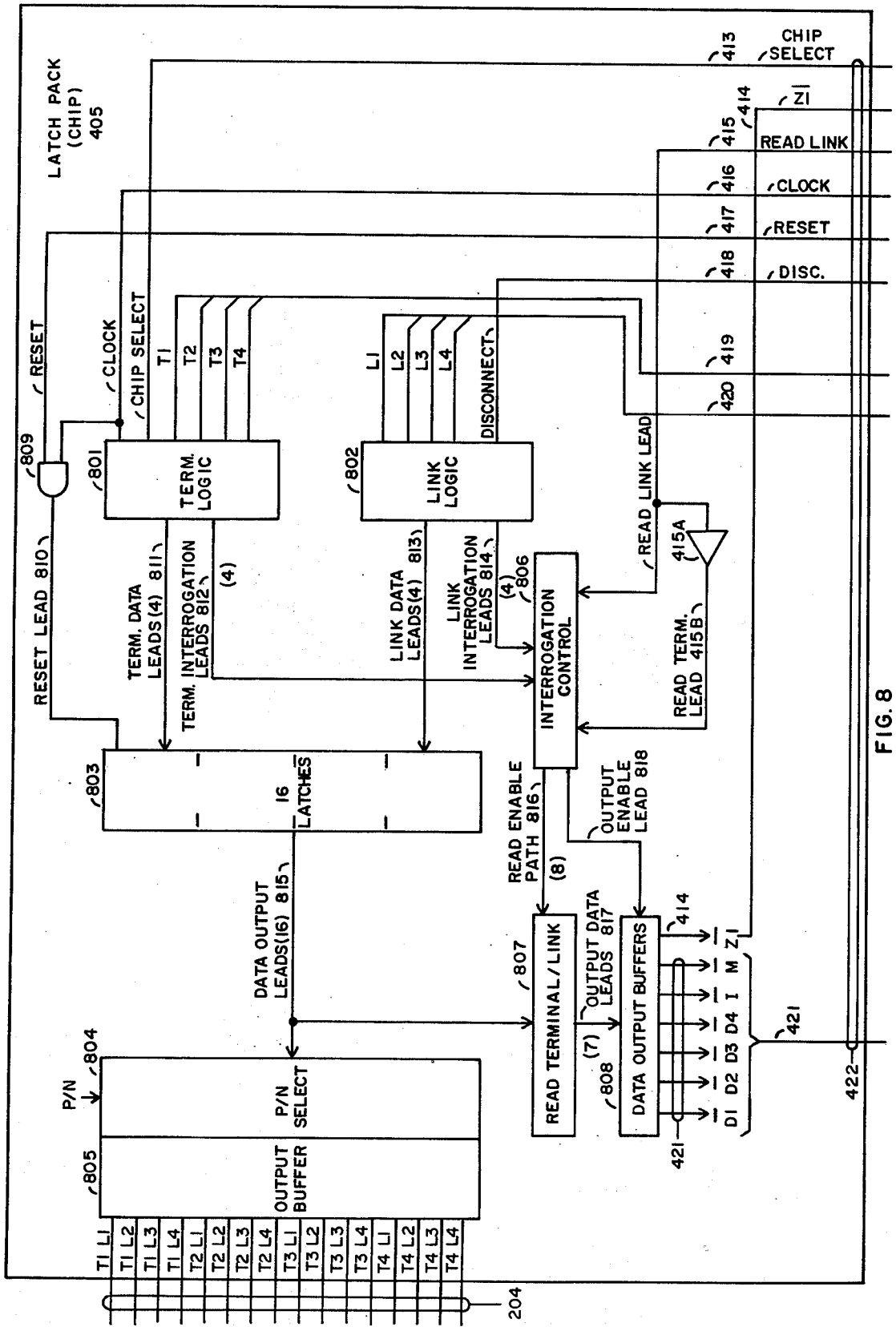
FIG. 8 is a schematic block diagram illustration of a latch-pack such as latch-pack 405 of FIG. 4.

Referring now to FIG. 8 there is shown thereat a more detailed block diagram of the latch pack (chip) 405 of FIG. 4, for example. Leads 413-420 and path 421 of path 422 are the same leads found in FIG. 4. Leads 204 in FIG. 4 comprise 16 leads from each latch pack or 64 leads total. In FIG. 4, the first and last of the 16 leads from latch pack 405 are shown with leads 2-15 indicated, whereas in FIG. 8 all sixteen are shown.

CROSSPOINT CONTROL

Critical to the crosspoint selection criteria is the provision of an efficient and reliable crosspoint control technique. The problem stated briefly is that the system must possess the capability to examine existing connections and distinguish "busy" connection paths, and must possess the capability to identify idle paths that can be utilized to establish a connection.

In the present arrangement, a unique design technique is realized that not only provides an effective solution to the control problem, but accomplishes control with an extremely simple, reliable approach utilizing a hardware map with a programmable memory, permitting an occupancy trace through memory scan. In effect, the latch functions as the control of the crosspoint switch and the binary state of the latch constitutes a bit in the programmable memory. The net result is that the matrix switch contact memory is integral to the matrix and eliminates the potential for a discrepancy between the actual matrix state and matrix state stored in matrix memory. This feature eliminates two potential sources of system performance risk: (1) if memory power should experience an intermittancy, the only way to regain proper matrix connection information would be an entire switch reset, i.e., all connections are broken down and the memory is cleared, and (2) the potential asynchronous condition between matrix state and matrix memory which can occur, comprises the required level of confidence in the matrix state critical to a communication system.

The selected control device, referred to as the latch pack, was specifically designed for the control of electronic solid-state matrices. The latch pack device consists of sixteen bistable latches or flip-flops 803, arranged in four groups of four latches each and packaged in a 40-pin DIP ceramic package. Functionally the latch pack resembles a four word, four bits per word Random Access Memory (RAM). When used in a matrix control, each latch is dedicated to the control of a specific four-wire crosspoint switch in the matrix. The latch pack differs from the RAM in that a lead from each memory bit exits the device to drive a crosspoint switch.

A functional block diagram of a single latch pack device is shown in FIG. 8. The latch pack measures approximately 2 (length) × 0.785 (width) and 0.295 in. (height) with pins for insertion into a printed circuit board and is a large scale integrated circuit (LSI). The terms terminal and link distinguish between the two sides of the matrix array and correspond to the address and data inputs of an RAM. Referring to the schematic, P/N (positive/negative) select 804, permits the polarity setting to be changed from active "Hi" to active "lo" in order to accommodate universal usage. In a fully developed system, approximately 10% of the total number of latch pack devices will be used in applications other than switch control. The reset function (over reset lead 417 and AND gate 809) allows all latches to be initialized to the zero or off state. The clock function is required to change the state of the latches whether resetting or writing into memory to prevent an inadvertent reset on the reset line. The chip select function via lead 413 is required for all latch state changes and latch data readouts with the exception of reset. Terminal inputs, T1, T2, T3 and T4 via path 419 to terminal logic circuit 861 are used to select (over path 811) one or more set(s) of latches in 803 into which information will be written and may be selected in any combination. The four link inputs L1, L2, L3 and L4 to link logic 802 contain the data information to be written into the set(s) of four latches over path 813.

The disconnect function via lead 418 and link logic 802 allows all zeros to be written into any set of four latches independent of the information on the link inputs. The disconnect function could be duplicated by writing all zeros into the link inputs to link logic 802, but would be less efficient because the disconnect function would require multiple matrix operations complicating the matrix control requirements. If the read link function is a logic one to interrogation control 806, the data output over terminals $\overline{D1}$, $\overline{D2}$, $\overline{D3}$, $\overline{D4}$, and $\overline{Z1}$ from data output buffers 808 will indicate the link to which a particular terminal is connected. If the read link function is a logic zero to interrogation control 806, the data output over such terminal will indicate the terminal to which a particular link is connected. This provides the read-left/read-right capability for bidirectional matrix control.

The Idle ($\overline{I}$), Zero ($\overline{Z1}$) and Multiple (M) outputs from data output buffer 808 are used in conjunction with the data outputs by the matrix controls 122A and 122B to determine idle/busy status, to determine multiple connect condition, and to permit a self-test of the latch pack internal logic. The gate control outputs T1, L1, T1, L2, etc., are used to control the crosspoint switches.

The latch pack is the interface between the network control, such as 122A and 122B and the crosspoint switches and allows distribution of the connect memory throughout the entire matrix. There exist three distinct advantages to this control design.

1. The connect memory grows automatically with matrix expansion.
2. Distributed memory throughout the matrix eliminates a disabling failure mode for connect memory, i.e., any bit failure affects but a single crosspoint switch.
3. Since the latch packs form a part of the matrix controller logic, the matrix controller expansion occurs automatically with the expansion of the matrix.

The selection of the standard process CMOS device yields a very favorable power requirement for latch pack operation. Despite the complex device configuration, the power required for all the latch packs, crosspoints, and junctors in a 960 termination switch, exclusive of line cards and buffer amplifiers, is typically 0.7 watts. The worst case power requirement is approximately 3 watts.

In greater detail relative to the latch pack of FIG. 8, the latch pack has two general functions: (1) Connecting and disconnecting crosspoints by means of stored data, and (2) Providing information upon being interrogated for path search and trace purposes. There are two trace modes: (1) Read link and (2) Read terminal.

The following outline summarizes the signals relative to the above. In the following, signals are indicated as binary 1, binary 0, and X which means immaterial or not pertinent.

| CONNECT OPERATION | |
|---|---|
| 1 of 4 T's | |
| 1 of 4 L's | |
| Chip Select | = binary 1 |
| Clock | |
| Dis | = binary 0 |
| Reset | |
| Read Link | X |

| DISCONNECT OPERATION | |
|---|---|
| 1 of 4 T's | |
| Chip Select | |
| Clock | = binary 1 |
| Disconnect | |
| Reset | = binary 0 |
| Read Link | X |
| Link Input | |

| READ LINK TRACE OPERATION | |
|---|---|
| 1 of 4 T's | |
| Read Link | = binary 1 |
| Chip Select | |
| Clock | |
| Reset | = binary 0 |
| Disconnect | |
| Link Inputs | = X |
| Examine $\overline{Z}$ and $\overline{D}$'s. | This gives link to which terminal is connected |

| READ TERMINAL TRACE OPERATION | |
|---|---|
| 1 of 4 L's | |
| Chip Select | = binary 1 |
| Clock | |
| Reset | |
| Disconnect | = binary 0 |
| Read Link | |

-continued

| CONNECT OPERATION | |
|---|---|
| Terminal Inputs | X |
| Examine Z̄ and D̄'s. | This gives terminal to which link is connected |

SEARCH OPERATION

Same except information of Z̄ with disregard of D̄'s.

With respect to the Z̄ and D̄ leads referred to above, the appropriate one's of these leads are directed via the MUX leads path 927 (FIG. 9) to the ABC group data multiplexer 904 which makes the examination.

If the Z̄ lead has the logic 0 signal thereon, the indication is that the links or terminals being read, as the case may be, are all idle. If the Z̄ lead has the logic 1 signal thereon, the indication is that not all links or terminals being read, as the case may be, are idle i.e., at least one is connected and thus busy.

It should be recalled by reference to FIGS. 2 and 6 that terminal 1 serving end instrument A, for example, is served by four latch packs, two for line extension and two for tone. If T1 is being interrogated therefore, the logic 1 signal would be placed on the T1 input of each of these four latch packs. The ABC group data multiplexer 904 then determines which link is connected thereto by logic which examines the intersection of Z̄s and D̄s in the following:

|  | D1 = 1 | D2 = 0 | D3 = 0 | D4 = 0 |
|---|---|---|---|---|
| Z̄1 = 1 | (L1) | L2 | L3 | L4 |
| Z̄2 = 0 | L5 | L6 | L7 | L8 |
| Z̄3 = 0 | L9 | L10 | L11 | L12 |
| Z̄4 = 0 | L13 | L14 | L15 | L16 |

Figure 9:
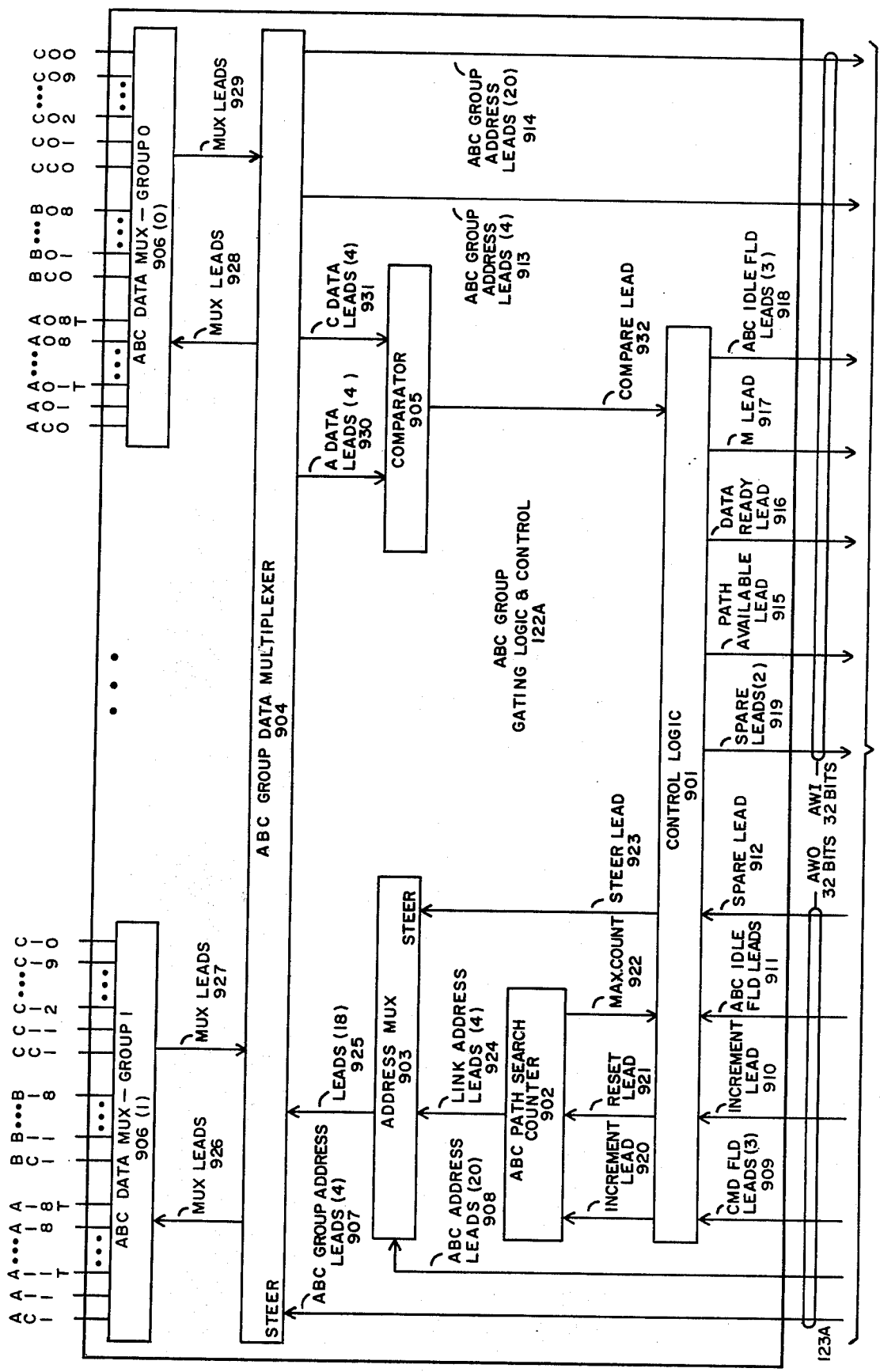
FIG. 9 is a more detailed block diagram of the ABC group gating logic and control block 122A of FIG. 3.

FIG. 9 is a more detailed showing of block 122A of FIG. 3, and as there shown, the 32 bit AWO path from marker 124 comprises the following:

| Path 907 | ABC Group Address Leads | (4) |
|---|---|---|
| Path 908 | ABC Address Leads | (20) |
| Path 909 | CMD FLD Leads | (3) |
| Path 910 | Increment Lead | (1) |
| Path 911 | ABC Idle FLD Leads | (3) |
| Path 912 | Spare Lead | (1) |
| | TOTAL | (32) |

Also the 32 bit AWI path to marker 124 is shown to comprise the following:

| Path 913 | ABC Group Address Leads | (4) |
|---|---|---|
| Path 914 | ABC Address Leads | (20) |
| Path 915 | Path Available Lead | (1) |
| Path 916 | Data Ready Lead | (1) |
| Path 917 | M Lead | (1) |
| Path 918 | ABC Idle FLD Leads | (3) |
| Path 919 | Spare Leads | (2) |
| | TOTAL | (32) |

Block 122A is seen to include the control logic 901 which is an interface with the marker common control 124; the ABC path search counter 902 and the address mux 903 which in general operate upon and pass signals as shown from the control logic 901 to the ABC group data multiplexer 904; the comparator 905 which in general operate upon and pass signals from ABC group data multiplexer 904 and to control logic 901; the ABC data mux group 1 circuit 906 (1) which operates upon and passes signals between the ABC group data multiplexer 904 and the latch pack circuits of FIG. 2. Similarly for the other ABC data mux circuits including the last ABC data mux — Group 0 circuit 906(0).

Referring to the MUX leads 926, these leads include the following:

3 leads provide 1 out of 8 selection, defining A-stage terminal.
3 leads provide 1 out of 8 selection determining A-stage section
3 leads provide 1 out of 8 selection defining A-stage link (AB link)
4 leads provide 1 out of 10 selection determining C-stage section
3 leads provide 1 out of 8 selection determining C-stage terminal (BC link)
1 lead provides ABC group enable
1 lead provides A-stage enable within the ABC group
1 lead provides B-stage enable within the ABC group
1 lead provides C-stage enable within the ABC group
1 lead provides clock enable
1 lead provides disconnect enable
2 control leads provide 1 out of 4 selection defining
  11 Connect or disconnect
  00 Trace right
  10 Trace left
  01 Path search Referring to the MUX leads 927, these leads include the following:

| 4 leads | (Z) | relative to A or C link |
|---|---|---|
| 2 leads | (Z) | relative to A or C terminal |
| 4 leads | (D) | ⎫ |
| 1 lead | (M) | ⎬ relative to A data |
| 1 lead | (I) | ⎫ |
| 4 leads | (D) | ⎬ |
| 1 lead | (M) | ⎬ relative to C data |
| 1 lead | (I) | ⎫ |
| 4 leads | (D) | ⎬ |
| 1 lead | (M) | ⎬ relative to B data |
| 1 lead | (I) | ⎭ |
| 2 leads | (Z) | relative to B link or terminal |

With reference now to FIG. 10, there is set forth thereat a more detailed showing of circuit 122B of FIG. 3. In FIG. 10, the 32 bit DWO path from marker 124 is shown to comprise the following:

| GRP Leads | (3) |
|---|---|
| SEC Leads | (4) |
| TERM Leads | (3) |
| LINK Leads | (4) |
| JUNCTOR STATUS Leads | (4) |
| JUNCTOR STATUS Leads | (4) |
| SPARE Leads | (2) |
| CMD Leads | (4) |
| ENABLE Leads | (3) |
| INCREMENT Lead | (1) |
| TOTAL | (32) |

Also the 32 bit DWI path to marker 124 is shown to comprise the following:

| M/P Lead | (1) |
|---|---|
| DATA Lead | (1) |
| SPARE Lead | (1) |
| GRP Leads | (3) |
| SEC Leads | (4) |

```
TERM Leads              (3)
LINK Leads              (4)
SEC TNE GRP Leads       (4)
STATUS Leads            (6)
IDLE Lead               (1)
LINE PREC Leads         (4)
              TOTAL    (32)
```

At the top of FIG. 10 it will be seen that the various leads to FIG. 2 are served as follows:
Reg Address Mux 122 : Leads RC-R8
D-Stage Ordered Pair Group Mux 113 : Leads DC10-DC5E
D-Stage Address Mux 114 : Leads D1111-D5803
Junctor Ordered Pair Group Mux 1115 : Leads JC1-JC5
Junctor Address Mux 1116 : Leads J111-J588
Tone Ordered Pair Group Mux 1117 : Leads TC1-TC5
Tone Address Mux 1118 : Leads T11-T548

Between the leads at the bottom and top of FIG. 10 will be seen various blocks for performing various functions.

Figure 11:
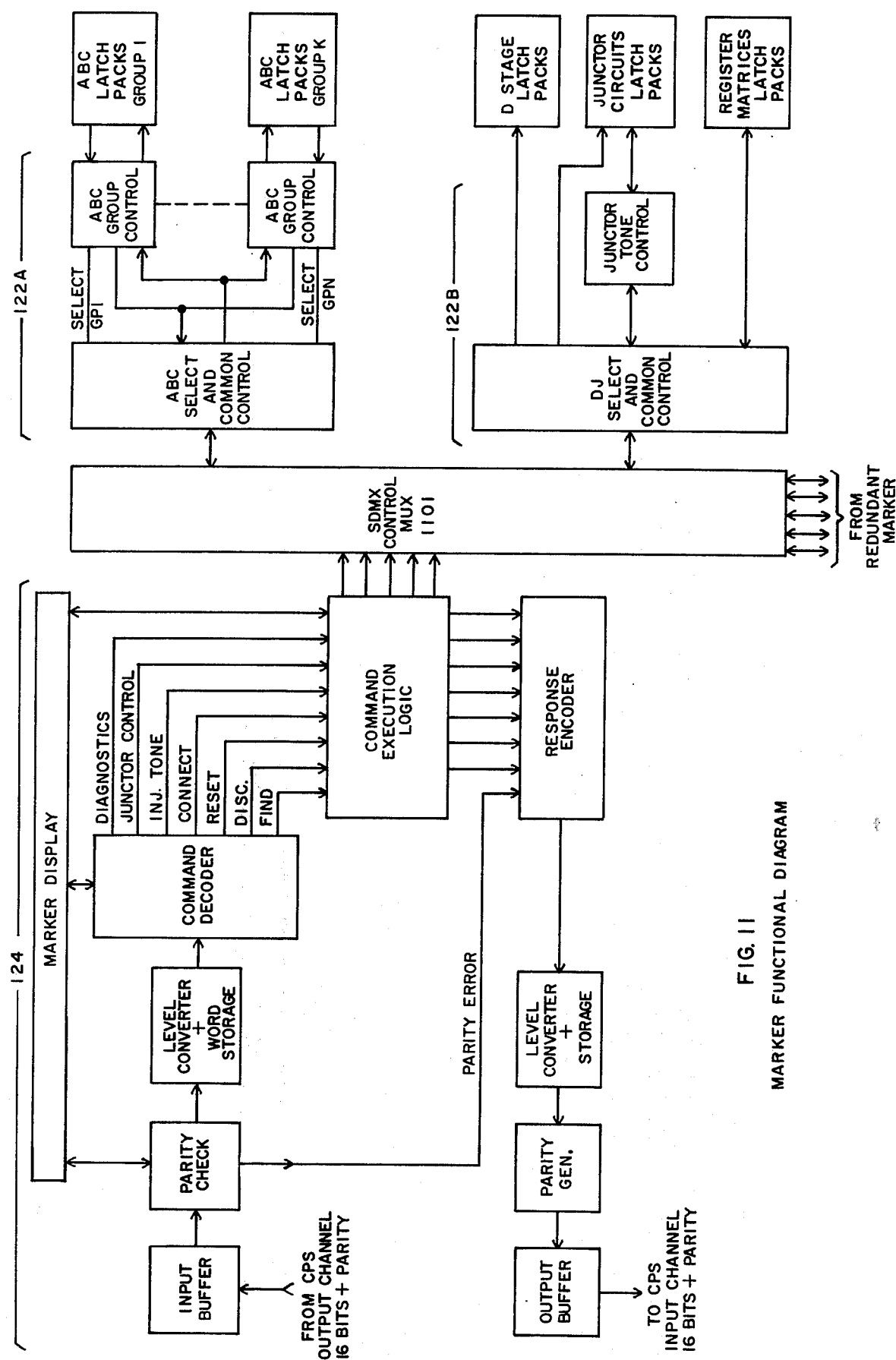
FIG. 11 is a functional diagram of the marker.

A marker functional diagram which is set forth in FIG. 11 illustrates the philosophy that the marker itself is distributed, and in effect extends from the buffers on the left to the latch packs on the right. This diagram also shows that there is an SDMX CONTROL MUX between the redundant markers and the circuits 122A and 122B of FIG. 3. The circuit 124 of FIG. 3 which is the marker common control is represented in FIG. 11 by the blocks to the left of the SDMX CONTROL MUX.

NETWORK CONTROL

The network, which consists of the ABC groups, D-J groups, and the register matrices is controlled by redundant network controllers called markers. Each marker is capable of exercising complete and independent control over the network regardless of the state of the other marker with only one marker exercising control at any given time.

The markers, which are normally under the direct control of the central processor system, CPS, perform the routine (fixed hardware) logic functions required to control the network. Each marker is capable of performing the following functions on command from the CPS.
Set up connections
Break down connections
Monitor the network and detect errors
Trace existing connections within the matrix from end to end
Maintain a connect map via the latch pack circuits
Inject supervision and information tones By performing these operations automatically when commanded by the CPS, the markers off load routine time consuming tasks of network control from the CPS.

MARKER ARCHITECTURE

The marker, shown in FIG. 11, consists of three functional sections, an input/output section, a marker logic section and matrix control section. The input/output section consists of buffers, parity check circuitry and parity generator circuitry and level converters and provides the interface to the CPS.

Commands from the CPS to the markers consist of two 16 bit words. The commands are stored in the command decoder for presentation to the marker logic.

Responses to the CPS are encoded by the response encoder and forwarded to the CPS as one to 10 16 bit words. Normal responses consist of either one or two words depending upon the type of command being performed. Words three through ten provide detailed fault isolation data in the event error conditions are encountered in the execution of the command.

The marker logic or command execution logic examines the command, controls the execution of the command, and determines the response to be returned to the CPS.

The network control or slave section of the marker is subdivided into two sections, (1) ABC group control and (2) D-J control. The ABC group control section contains the logic circuits 122A necessary to interrogate or address the correct set of latch packs in the ABC groups of the network on command from the execution logic and format the information from the latch packs for use by the execution logic. The D-J control section contains the logic circuits 122B necessary to interrogate or address the correct set of latch packs in the D-stage, junctor array, and register matrices on command from the execution logic and performs preliminary operations on the information. The D-J control also formats the reply information for use by the execution logic.

MARKER OPERATION

As mentioned previously, the markers are under the direct command of the CPS during normal operation. A maintenance/display panel associated with the markers allows each marker to be taken off-line to be manually exercised or to be automatically diagnosed by the CPS diagnostic programs. In the off-line mode, the marker is disconnected from the network and cannot interfere with the operational marker.

In the on-line mode, the marker responds to a set of seven commands from the CPS which are:
Find A — Instructs the marker to interrogate the status of a particular terminal (A) and, if busy, to trace the connection.

Connect A to B — Instructs the marker to interrogate the status of two specific terminals, A and B, and if they are idle, to find a path between them and set up the connection.

Disconnect A — Instructs the marker to interrogate the status of a specific terminal (A), trace the connection existing between A and some other terminal and breakdown the connection.

Inject Tone — Instructs the marker to switch a particular tone from either an A-stage tone bus or a junctor tone bus into the receive path of a particular terminal.

Junctor Control — Instructs the marker to examine or change the status of a junctor circuit. To determine which junctor circuit, the marker traces the path from a particular terminal to the junctor.

Diagnostic — This command consists of a set of subcommands which allows a variety of network operations and interrogations to be performed for fault isolation and routine maintenance.

Reset — This command forces the marker into the reset mode and inhibits it from performing network operations. It is issued whenever the marker does not respond to the CPS within a specified time limit after receiving a command or when the response to the CPS indicates that the marker is malfunctioning.

The marker, after it has received a command from the CPS and has attempted to initiate the proper network operations, responds to the CPS by reporting the success or failure of the network operation, and if a failure, the reason for and the location of the failure.

The connect command is the most complex command the marker must execute. It involves the following major steps:

Step 1

Check parity of the input command-if correct proceed to step 2; if not, send a parity error message to the CPS and stop.

Step 2

Trace A terminal — if idle proceed to Step 3; if not, report "A busy" to CPS.

Step 3

Trace B terminal - if idle proceed to Step 4, path search 1; if not, report "B busy" to CPS.

Step 4

Path search 1 — this routine looks for idle C-D links to the proper ABC groups and at least two idle junctors in the junctor rows involved in all ordered pair D-J groups, one ordered pair group at a time. If successful, proceed to Step 6; if not successful proceed to Step 5.

Step 5

Path search 2 — this routine looks for idle C-D links to the proper ABC groups and any idle junctors in the junctor rows involved in all ordered pair D-J groups, one ordered pair group at a time. If successful, proceed to Step 6; if not successful, report that path is blocked.

Step 6

Search for path A to the selected C-D link in the ABC group involved. If successful, proceed to Step 7; if not successful, return to Step 4.

Step 6a

Store in the marker the identity of the connection to Path A.

Step 7

Search for a path from B to the selected C-D link in the ABC group involved. If successful, proceed to Step 8; if not successful, return to Step 4.

Step 8

Connect path in the ABC groups involved, one at a time, and then the D-J stage. Proceed to Step 9.

Step 9

Trace the path from A to B through the network — check for multiple connections — if multiple connections exist, initiate disconnect routine; if no multiple connections exist, proceed to Step 10.

Step 10

Trace the path from B to A through the matrix. Check for multiple connections — if multiple connections exist, initiate disconnect routine; if no multiple connections exist, proceed to Step 11.

Step 11

Store the status information in the junctor circuit. Check for accurate storage; proceed to Step 12.

Step 12

Report that the connection was accomplished to the CPS.

There are several steps and network-marker checks involved in each step of any command executed by the markers. These provide a measure of on-line diagnostics should an error occur since, when an error is encountered, the marker responds to the processor with an error/status message.

The path search routines, mentioned above, directly affect the blocking probability of the matrix because they are designed to search for any one of all possible paths between two terminals. The path search proceeds in the following manner.

The marker searches for idle coincident C-D links to the ABC group or groups involved in the call and for an idle junctor accessible to those idle links in the entire D-J group. If successful, a search is made in the ABC groups to determine whether or not a complete path exists. If unsuccessful, the next D-J group is examined.

The marker searches for idle coincident links between the C and D stages by D-stage array ordered pairs: (1,2), (3,4), (5,6), (7,8), (9,10), (2,1), (4,3), (6,5), (8,7), and (10,9). This results in ten attempts to find coincident idle links between the D and C stages. An unsuccessful search can resut for the following reasons: (1) no coincident idle links exist, (2) coincident idle links exist but not the required idle junctor(s), (3) coincident idle links existed but no complete path through the ABC stages existed. Whenever a set of coincident idle links exist, an attempt to complete the path is performed in the ABC groups.

If the search in the above step is unsuccessful, the marker attempts the same search sequence in the other four D-J ordered pair groups (one at a time). This results in the marker examining every possible path between any two subscribers.

Certain constraints on junctor selection are imposed which enhance the availability of the junctors. These constraints are:

a. The last junctor in a row in a D-J ordered pair group will not be selected if there is more than one idle junctor in any of the other rows in that group.
b. If every row of junctors in a D-J ordered pair group has only one idle junctor left, the marker will start its search in some other ordered pair group in which this is not the case. The last idle junctor in a row will be used as a last resort.
c. The junctor-select logic will attempt to preserve at least one idle junctor in every row of every D-J group.

The latch packs store all connect data of the matrices and implement the stored data by driving the FET crosspoints. They are designed in such a manner that the stored data may be interrogated by the marker without affecting the data or the state of the crosspoints. In this manner, the latch packs form the connect memory of the matrix and provide the information necessary for the markers to perform their functions. It is important to note that the latch pack memory is a direct memory, i.e., that the latch packs reflect the exact state of the matrix, as opposed to an indirect memory stored elsewhere in the system which could be "out-of-sync" with the matrix. Since the latch packs are an integral part of the FET switching array printed wiring boards, expansion of the matrix automatically results in expansion of the connect memory.

In path searching, suppose the selected idle coincident link pair comprises the CD link 1 connected to the uppermost D-matrix 1 and the CD link 10 connected to the D-matrix 2 just below said 1.

The path search from the CD link 1 to end instrument A would comprise (1) a search to find idle AB links from A-stage matrix 202 to stage B matrices; (2) a search from the CD link 1 to find idle BC links to stage B matrices; selection on the basis thereof of a common stage B matrix which can complete the connection. The path from the CD link 1 to the end instrument A is then completed.

A similar path search is then made from CD link 10 to the called end instrument F. The path from the CD link 10 to the called end instrument F is then completed.

It should be observed that closing of the path to the calling end instrument before making the search to the called end instrument is a way to insure that, if both are in the same ABC group, the elements of the first path will appear busy when the searching is done to find an idle path to the called end instrument.

SEQUENTIAL DESCRIPTION

In the following description, path searching will be described in more detail with respect to the setting up of the main connection path, and in less detail with respect to setting up of a connection from the calling end instrument to a register.

Specifically, a sequential description of a call from end instrument A which might have directory number 8594 to end instrument F which might have directory number 8123 (FIG. 2) is now set forth.

1. The calling end instrument A goes off-hook marking the associated line circuit.
2. The scanner 121 (FIG. 3) picks up the off-hook condition over path L1, resulting in this information being placed in data memory 130.
3. At the appropriate time, processor 133 picks up the off-hook condition.
4. Processor 133 via path 131 causes data memory access 128 to pass this information with the identity of the calling terminal and an idle register-sender from data memory 130 over paths 129 and 127 to marker common control 124.
5. The marker common control 124 via the SDMX control MUX 1101 of FIG. 11 and paths 123A, 123B causes the ABC group gating logic and control circuit 122A and the DJ group gating logic and control circuit 122B to effect connection of end instrument A to register-sender 1 designated 117, for example, over the path, for example, (See FIG. 2) from end instrument A, associated line circuit L1, terminal 1 of A-stage matrix 1 designated 202, AB link 1 to B-stage matrix 1, BC link 1 to C-stage matrix 1, CD link 1 to D-stage matrix 1, DJ lead 1 to junctor 1 designated 208, junctor 1 designated 208, DJ lead 1 to D-stage matrix 2, link 11, to the register matrices circuit 115 to register-sender 1, designated 117, from which the calling end instrument A receives dial tone.
6. Thereupon the calling subscriber dials the directory number of the called subscriber into register 117. As each digit is dialed the processor 133 receives the same via the "mailbox" 130. As the first digit is received, the processor via the mailbox and path 126 marks the register to discontinue dial tone. When the processor has received all the digits of the called number, the processor via the mailbox and path 127 conditions the marker to effect disconnection of the path from end instrument A to register-sender 117; but the identity of the calling end instrument and the called number are retained in the processor.
7. The processor converts the calling identity and the called directory number to 10 bit A-stage addresses as follows:

| A-stage group | 4 bits |
| A-stage section | 3 bits |
| A-stage terminal | 3 bits |

End instrument A would be represented as follows:

| Group | Matrix | Terminal |
| --- | --- | --- |
| 0000 | 000 | 000 |

End instrument F which could have directory number 8123 for example would be represented as follows:

| Group | Matrix | Terminal |
| --- | --- | --- |
| 1010 | 111 | 111 |

Also the calling identity is translated into the directory number to obtain class markings.

8. The processor then commands the marker to find a path between the two given A-stage addresses (end instruments). Path search then proceeds as follows:

a. A type 1 valid path is found in the D-J stage. A type 1 valid path is one which will connect the two A-stage groups of interest, and has at least two junctors available in the selector junctor row for that connection. If a type 1 valid path is not available, then a type 2 valid path is searched for. A type 2 valid path is one which will connect the two A-stage groups of interest, and only one junctor need be available in the selector junctor row. The advantage of using a type 1 valid path and a type 2 valid path is to insure equal traffic distribution throughout the D-J stage which enhances the traffic through output of the matrix.

b. After the D-J search has been successfully completed, the marker then communicates with the latch packs of the ABC stages to find a path from one of the CD link of the selected coincident pair to the calling terminal.

c. The marker then communicates with the latch packs of the ABC stages to find a path from the other CD link of the same coincident pair to the called terminal.

A more detailed description follows:

The marker sends a DWO (*Data Word Out* Signal) (D-J stage output word) to the DJ stage circuit 122B (see FIGS. 3 and 10). The command field (4 bits) and the enable field (3 bits) (see bottom of FIG. 10) are decoded by logic gates in control logic circuit 1002 (which may be an SN7442). The decoded information places the control logic 1002 (refer to FIG. 10) in the path search D-J state.

The network architecture is such that the CD link number of the D-stage is equal to the ABC-stage group number (refer to FIG. 2). Therefore the data that is required by the D-stage logic 122B to find a valid path is the CD link number required for the calling and called ABC stage groups. This information is presented to the D-stage control logic 122B in the DWO (refer to FIG. 10) over the group leads (3) to Input Data Mux (1001).

The path search logic must now determine if a type 1 valid path exists somewhere in the D-J module (the entire D-J stage). In the following description, a D-stage section is defined to mean a D-stage matrix and accompanying latch packs. The logic will accomplish this in a number of discrete steps; (a) The ordered pairs of the D-stage are interrogated, i.e., all the D-stage sections numbered 1 of 2 and all D-stage groups of FIG. 1C which constitute an ordered pair group of FIG. 1D will be interrogated to determine if the appropriate link pairs are idle. Simultaneously, the junctor circuits associated with these ordered pair sections are interrogated to determine if at least two junctors in a row are idle. A row consists of the junctor circuits of a particular junctor group associated with the D-stage terminals of a particular ordered pair of D-stage sections, i.e., the junctor circuits connected to the D-stage terminals of D-stage sections 1 and 2 (note a junctor connects to the same terminal number of both D-stage sections of an ordered pair) of a particular junctor group form a junctor row.

If the ordered pair group being interrogated does not contain a type 1 valid path, then the next ordered pair group is interrogated. This interrogation continues until one of the following occurs: (a) all ordered pair groups are interrogated and none meet the requirements of a type 1 valid path or, (b) an ordered pair group is found that does contain a type 1 valid path. If case (a) occurs then the ordered pair groups are interrogated to determine if a type 2 valid path exists. If a type 2 valid path does not exist, then the processor is informed that the D-J module is blocked. If either a type 1 or a type 2 valid path is found, the path search procedure continues.

The D-stage logic 122B interrogates the ordered pair group in the following way. The output of the ordered pair group counter (binary counter such as SN74191, 1006 FIG. 10) and the link leads which are gated by the input data MUX 1001 and the D-stage address MUX 1114 implemented using logic gates such as an SN7400), are used to address the D-stage latch packs.

The output data leads Z in paths CD10 and DC1E from the D-stage latch packs, are multiplexed in the D-stage ordered air MUX 1113. The output of multiplexer 1008 implemented using logic gates is then fed to the junctor and DSFC comparator 1009, composed of NAND gates such as SN7400. The "IDLE" outputs from the junctor circuits, JC1 through JC5, are connected to the junctor ordered pair group MUX 1115. The output of the junctor ordered pair group MUX is connected to the junctor MUX 1010 which is steered by the ordered pair group counter 1006. The output of this circuit is connected to the junctor and DSFC comparator 1009. This circuit "ands" the inputs and determines if a valid path exists. The signal "anding" is such that it will determine if a type 1 or type 2 valid path exists. If a valid path does exist, then a signal is sent to control logic 1002 from 1009 which causes the control logic 1002 to enter the next stage of path search. The control logic is implemented using gates and flip-flops such as SN7400 and SN7474.

If a valid path does not exist, then the link data used to address the D-stage sections is reversed, i.e., the link data used to address the first section of the ordered pair is used to address the second section of the ordered pair and vice versa. This is accomplished in the D-stage address MUX 1114. Then the ordered pair group is interrogated as before. If a type 1 valid path does not exist, the ordered pair group counter 1006 is incremented by the control logic 1002 and the process is repeated.

After an ordered pair group, which contains a type 1 valid path is found, the D-stage control logic 1002 next determines which is the first row (see FIG. 1E) of the ordered pair group containing the type 1 valid path. To do this, the ordered pair row counter (1005, FIG. 10) is used to address the D-stage latch packs of a particular group. The binary output of 1005 is decoded by the D-stage latch pack select circuitry 1011 the output of which via 1114 enabled the chip select function of the latch packs of a particular group. This function is performed in the D-stage address multiplexer 1114. The determination of the existence of a valid type 1 path is made as before. The ordered pair group row counter 1005 is incremented by the control logic 1002 until a the first row containing two idle junctors is found.

After the D-stage ordered pair row is found, the junctor column (see FIG. 1E) must be determined. (A column consists of the junctor circuits of all junctor rows associated with a particular DJ link of a particular ordered pair group, see FIG. 1E, and by addressing the first D-section of the selected ordered pair. The addressing is as follows: D-stage group is from the ordered pair group counter 1005, D-stage section is from the ordered pair counter 1006, D-stage link is from the input data MUX 1001, and the D-stage terminal number (same as junctor column) is from the column counter 1019. These signals are presented to the appropriate D-stage latch pack by the D-stage address MUX 1114. When an idle indication is received from the latch pack data lines, this indicates that one of the available junctors has been determined. The actual determination of the idle D-stage DJ link to be selected is made by the control logic 1002. If an idle DJ link is not indicated, the column counter is incremented by the control logic until it such is found. After the D-stage DJ link is determined, this data is output to the marker common control (124) by the output data MUX 1003. The control logic 1002 informs the marker that a valid path exists.

The search for a type 2 valid path is as above, except that the junctor and DSFC comparator 1009 gates the input signals to determine if a type 2 valid path is present, that is, that a single idle junctor in the selected row exists.

At this point in the path search the following is known:
D-stage ordered pair group
D-stage ordered pair sections
D-stage links
D-stage DJ links
A-stage terminals
A-stage sections
A-stage groups.

The following network identities exist:

| A-stage group | = B-stage group = C-stage group = D-stage link |
|---|---|
| D-stage group | = C-stage CD link |

D-stage section = C-stage section

The marker then uses the above identities and the information received in the D-J path search to format an AWO (ABC module command word) to the ABC switching group (module) (refer to FIG. 9), through path 907 and the ABC path search counter 902, address MUX 903 and ABC group data MUX 904.

The architecture of the ABC module is such that if a B-stage section whose A-B link which is equal to the A-stage section number and whose B-C link which is equal to the C-stage section number, is determined to be idle, then the path can be established. This is true since the C-stage B-C link is equal to the B-stage section number and the A-stage AB link is equal to the B-stage section number. Thus, assuming the calling end instrument to be end instrument A connected to the uppermost A-stage matrix (FIG. 2) and the calling C-D link of a coincident link pair to be the first one out of the uppermost C-stage matrix in FIG. 2, the search narrows down to searching for corresponding pairs of idle links from the A and C stage matrices to a B-stage matrix. As illustrated, eight such searches are possible.

| Search | AB Link | B Matrix | BC Link |
|---|---|---|---|
| 1st | 1 | 1 | 1 |
| 2nd | 2 | 2 | 2 |
| 3rd | 3 | 3 | 3 |
| 4th | 4 | 4 | 4 |
| 5th | 5 | 5 | 5 |
| 6th | 6 | 6 | 6 |
| 7th | 7 | 7 | 7 |
| 8th | 8 | 8 | 8 |

That is, when a corresponding pair of idle links are found, the B-stage matrix is determined.

Alternatively, the ABC path search may consist of interrogating the B-stage, a B-stage section at a time, until the condition of coincident B-stage idle links, as defined above, are met.

The AWO to the ABC control logic 901 contains the following information: C-stage section, C-stage C-D link, ABC group, A-stage terminal and A-stage section. The command portion of the AWO is path search. The command is decoded by the control logic 901. The first B-stage to be interrogated is addressed by the address MUX 903. The B-stage section to be interrogated is determined by the ABC path search counter 902; all other data comes from the ABC group address leads 907. The latch pack is addressed by the ABC data MUX 906 as determined by the ABC group data MUX 904 over MUX leads 926. The data lines from the addressed latch pack are routed to the comparator 905 via the ABC data MUX group 906 and the ABC group data MUX 904. The comparator logically combines the data, using logic gates, to determine if an appropriate B-stage section exists that is, a coincident idle condition. If it does not, the ABC path search counter 902 is incremented by the control logic.

When an appropriate B-stage section is found, the B-stage data is output to the marker common control 124 along with the rest of the path data (ABC stage parameters as defined in the AWO shown on page 7) by the control logic. The control logic also informs the marker common control that a valid path exists. If no valid B-stage section was found, the marker common control would be told that a path did not exist. The marker common control would then command the D-J module to perform another path search in the next D-J ordered pair group. The marker common control keeps track of the D-J paths found by the D-J path search logic, so that the marker common control can determine if all possible paths have been tried before informing the central processor that the path is blocked.

If a path is found for the first subscriber, the marker common control commands the ABC module to make this connection. After this connection is made in the ABC module, the marker common control commands the ABC module associated with the second subscriber by effecting the same search route in the ABC group in which the called party's termination is located to find a path for the second subscriber. This proceeds as described above.

If there is no path in the ABC module for the second subscriber, the marker breaks down (disconnects) the first subscriber connection and commands the D-J module to begin a new path search as described above.

After the path is found for the second subscriber, the path in the ABC module and the path in the D-J module is connected. The marker then informs the central processor that the connection has been made.

A connection in the ABC module is made by presenting the complete address of the path in an AWO via path 123A along with a connect command.

A connection in the D-J module is made by presenting the address of the D-J path to the D-J module in a DWO via path 123B along with a connect command and a D-J enable field.

The call sequence then continues as follows:

9. Ring signal is sent to the called party and ringback is sent to the calling party. In such step, latch pack 209 under marker common control controls junctor 208 to effect splitting of calling and called paths in the junctor. Also under marker common control, latch pack defined by TC1 and T11 is marked to control the associated tone matrix to connect ring and ringback tone to the calling and called paths of the junctor.

The path for the ring signal, for example, might be from the block 110, lead ST2 (indicated) the tone matrix defined by TC1 and T11, junctor 208, DJ link 1 from junctor 208 to the second D-stage matrix of ordered pair 1 of ordered pair group 1, the CD link 10 out of this matrix to the second C-stage matrix of the ABC group 0, the BC link out of this matrix to the eighth B-stage matrix of the ABC group 0, out of this matrix to the eighth A-stage matrix of ABC group 0, out of this matrix via line circuit L640 to the end instrument F.

The path for the ring back signal for example might be from the circuit 110, lead ST3 (indicated), the tone matrix defined by TC1 and T11, junctor 208, DJ link 1 from junctor 208 to the first D-stage matrix; the CD link 1 out of this matrix to the first C-stage matrix of the ABC group 1, the BC link out of this matrix to the first B-stage matrix of the ABC group 1, out of this matrix to the first A-stage matrix of ABC group 1, out of this matrix via line circuit L1 to end instrument A.

It should be observed that the calling and called connections are split in junctor 208 at this time.

10. The called party goes "off-hook". The processor becomes aware thereof via the scanner 121, which signals the marker.

11. The ring signal and the ring back signal are stopped via latch pack defined by TC1 and TC11 and the speech path is enabled by connecting the calling and called paths in junctor 208 via latch pack 209.

12. The subscribers may now communicate.

13. One of the subscribers goes "on-hook". This is recognized via the scanner.

14. The call is disconnected in the following manner. The processor is informed, by the line scanner, that subscriber B, for example, has gone on-hook. The processor then issues a command to the marker "disconnect subscriber B". The marker must first determine to whom B is connected and the identity of the path. Since this data resides in the latch packs of the network, the network must be interrogated. The interrogation process is known as path trace. The marker formats a path trace right command to the ABC module via CMD FLD leads designated 909 (path trace right infers a trace from section A to section C). The input data to the ABC module is A-group, A-term, and A-sec. This data comprises the address of subscriber B and comes to the marker from the central processor.

The following identities exist in the ABC module.
A-stage sec number = B-stage AB link number
A-stage AB link number = B-stage section number = C-stage BC link number
B-stage BC link number = C-stage section number
A-stage group number = B-stage group number = C-stage group number The A-stage sections are designated and implemented such that if the A-stage terminal, A-stage group, and A-stage section are presented to the A-stage, then the addressed A-stage section wil respond, via its data lines, with the AB link to which the addressed terminal is connected. The A-stage will also respond with the connected terminal number when addressed by the A-B link. The B, C, and D-stage sections also contain this feature. Thus by use of the A-stage address and the identities presented above, the entire path through the ABC module can be found.

The marker common control (R4) presents an AWO, refer to FIG. 9, to the ABC module. The control logic 901 decodes the command "trace right". The A-stage address is input to the ABC address MUX 903.

More specifically the ABC address multiplexer 903 is directed to interrogate the ABC module by the control logic 901. The A-stage group address is then decoded by the ABC group data multiplexer 904 which transfers the address data to the correct ABC data MUX 906. The ABC data MUX 906 interrogates the desired A-stage address. The response from the matrix is gated by the ABC by the ABC data MUX 906 to the ABC group data MUX 904 which presents the data to the marker common control. The data presented to the marker common control is
A, B, C-stage group number
A-stage terminal number
A-stage section number
C-stage section number
C-stage C-D link number This data is stored in marker common control memory.

The D-J module must now be interrogated in order that the path trace continue. The identities that exist in the D-J module and between the D-J module are:
For FIG. 1D:
D-stage ordered pair group number = C-matrix pair number
C-matrix pair CD link number to D-stage = D row number
C-matrix pair group number = D-stage C-D link number The D-J module interrogation takes place in two steps: (a) The D-J module is given a trace right command which determines the D-stage junctor terminal. This data is then used to calculate the section number of the other section of the ordered pair, using the identities stated above; (b) The D-J module is given a trace left command (the D-stage section, D-stage group and junctor terminal are used to address the latch packs, the latch packs respond with the other D-stage C-D link number).

More specifically the marker common control formats a DWO to the D-J module, refer to FIG. 10, the command is trace right, the address is D-stage group number, D-stage section number, D-stage C-D link number. The control logic 1002 decodes the command. The input data MUX 1001 routes the address data to the D-stage address MUX 1114. The D-stage address MUX addresses the D-stage latch packs, under control of the control logic 1002. The D-stage latch packs respond on the D lines to the D-stage ordered pair group MUX 1113. This data is routed to the output data MUX 1003 which presents the data (number of D-stage junctor terminal) to the marker common control. The marker common control stores this data and uses it to format a second DWO, a trace left command. The address to the D-J module is the D-stage group number, the calculated D-stage section number and the D-stage junctor terminal number. This data is acted upon by the D-J module as described above. The response data that is presented to the marker common control contains the other D-stage C-D link. This data is stored in the marker common control.

The marker common control now must interrogate the ABC module again to determine the end point of the path.

The marker common control now formats an AWO to the ABC module, the command is trace left (from the C-stage to the A-stage). The address data, derived from the given identities and data determined, is ABC stage group number, C-stage section number and C-stage C-D link number. This address is presented to the ABC module as was described above. The ABC module responds with the following data, C-stage B-C link number, A-stage section number, and A-stage terminal number. The marker common control stores this information. The marker common control now contains, in its memory, the entire path of the circuit.

The marker common control then proceeds to disconnect the path as follows.

The marker common control issues a disconnect command to the ABC module. The address presented to the ABC module is ABC stage group number, A-stage terminal, A-stage matrix, A-stage BC link number, C-stage section number and C-stage CD link number C-stage matrix (for the first part of the path). The path address is presented to the latch packs (refer to FIG. 9) by the address MUX 903, the ABC group MUX 904 and the ABC data MUX 906. The control logic 901 decodes the command and issues a disconnect strobe to the latch packs which disconnect this path and only this path. All other paths remain unaffected. The marker then issues a second AWO to the ABC module. The command is disconnect and the address is the address of the last part of the path. This part of the path is disconnected as described above. The marker then issues a disconnect command to the D-J module to disconnect this portion of the path.

The marker issues a DWO, the command is disconnect, the address contains the D-stage group number, D section number of both sections of the ordered pair, the two D-stage C-D link numbers and the junctor terminal number. Refer to FIG. 10. The address is presented to the D-stage latch packs by the D-stage address MUX 1114 via the input data MUX 1001. The junctor circuits are also addressed by the junctor address MUX 1116 via the input data MUX 1001. The control logic 1002 decodes the input command and issues a disconnect strobe to the latch packs and junctor circuits to disconnect this portion of the path. The entire path has now been disconnected. The marker informs the central processor that the path is disconnected.

ALTERNATIVE SEARCH METHODS

In an alternative path search method in the nonsymmetric four-stage switching network the first ordered pair group from the starting point is searched, and the search proceeds sequentially for the first (from the point of starting) idle coincident C-D link pair. Then by a "snap shot" of all junctors in the row, the system determines whether or not at least one junctor is idle. If yes, the sequential search for the first idle junctor is made. If no idle junctor in the row is available, search is made for the next coincident link pair. If the ordered pair group is exhausted the search proceeds to the next ordered pair group.

In larger systems having a software map instead of the hardware latch pack map, a further alternative searching method, which would provide a saving of real time, would have merit and is as follows:

Considering the first ordered pair group from starting point by taking a snap shot of all coincident CD link pairs to determine which pairs are idle. If there were no idle coincident pairs, go to the next ordered pair group.

Starting with the first idle pair, take a snap shot of the junctors to determine whether or not there is at least one idle junctor. If answer is yes, search sequentially to find the first idle one.

If there was no idle junctor in the row upon taking the snapshot, go to the next idle coincident pair.

If there is no idle coincident pair having an idle junctor, go to the next ordered pair group.

CONCLUSION

The non-symmetric network and its control system provides several distinct advantages. The network allows efficient expansion with expansion ratio from minimum size to maximum size of 1:32 with a minimum of unused crosspoints and constant traffic handling capacity. Expansion of the network requires expansion of the D-stage arrays only, with a minimum disruption of existing service.

The configuration of the network allows all possible paths between any two terminals to be examined quickly and simply. This in turn reduces considerably the number of crosspoints required for a given traffic loading and grade of service.

Switching arrays large enough to degrade transmission performance are not required for any size matrix within the system requirements.

Use of the latch packs for crosspoint control provides positive control of each crosspoint and results in the connect memory of the network being distributed throughout the entire network. This has the added advantage that when the network is expanded, the connect memory and control system are automatically expanded.

The use of CMOS latch packs and the J-FET crosspoints results in a network which dissipates minimum power (less than 60 micro-watts per crosspoint).

The use of the J-FET crosspoints allows all of the stringent transmission parameters of the system to be met. A brief summary of some of the measured transmission characteristics of the network is listed below:

| | |
|---|---|
| Bandpass | 10 Hz to 600 kHz |
| Flat response (±0.1 dB) | 10 Kz to 250 kHz |
| Crosstalk rejection (at 100 kHz) | > 90 dB |
| Idle channel noise | < − 10 dBrn |
| Intermodulation products | < − 70 dB |

A further disclosure of the system parameters is set forth in the thesis entitled "Blocking Probability In Non-Symmetric Multi-Stage Networks", written by Dr. Sushil G. Munshi, and submitted to the Department of Electrical Engineering, Ohio State University, 1974.

The novel non-symmetric structure (3+1) disclosed herein provides for growth with considerable ease. In contrast to the conventional four-stage (2+2) networks where rearrangement of junctors is required, for growth, the present (3+1) structure can be expanded by providing the necessary access to the D-matrices without disturbing any other existing matrices. The ultimate growth depends only on the physical permissible size of D-matrices and not by the number of junctors provided in the conventional symmetric four-stage networks.

Traffic capacity is must greater in the conventional four-stage network. Blocking probability can be made arbitrarily small with less crosspoints than those required in the symmetric four-stage networks. The configuration shown as an example can handle 0.8 erlang of traffic per terminal with a blocking probability of less than 0.001. A folded 2+2 network accommodating the same number of terminals using conventional searching methods with traffic per terminal of 0.3 erlang would provide a blocking probability of less than 0.001.

path searching routine and the associated distributed control minimize the search time and at the same time test for all possible idle paths for the desired connection.

The configuration provides a number of alternatives for the improvement in traffic handling capabilities; by increase in number of junctors, increasing the number of C-matrices in each ABC group for increasing the number of junctors, increasing the number of C-matrices in each ABC group for increasing the number of selections and reconfigurating the three-stage modules.

Due to the ease of growth mentioned before, the configuration can be designed for a large variety of system sizes and modularity desired.

We claim:

1. A non-symmetric folded four-stage switching network comprising a first stage A having K groups of switching matrices, each group being comprised of 1-M matrices, a second stage B having K groups of switching matrices, each group in said second stage being comprised of 1-N matrices, the matrices of corresponding ones of said groups in said first and second stages A, B being interconnected, a third stage C having K groups of switching matrices, each group in said third stage C being comprised of 1-P matrices, the matrices of corresponding ones of said groups K in said second and third stages B, C being interconnected thereby providing a plurality K of ABC switching groups, and a fourth stage D comprising a distribution stage having a plurality of switching matrices, each of which switching matrices in said D stage is interconnected with a matrix in each of said K groups in said C stage, and each of which switching matrices in said D stage is connected to an associated plurality of junctors to provide a folded matrix.

2. A switching network as set forth in claim 1 in which the matrices of said first stage A include a plurality of terminals for connection to communication paths.

3. A switching network as set forth in claim 1 in which the matrices of said C stage are arranged in pairs, and the matrices of said D stages are arranged in corresponding pairs, and each pair of matrices in said C stage is connected to the corresponding pair in each of the groups in said D-stage.

4. A switching network as set forth in claim 1 in which each of said switching matrices has a plurality of crosspoints for switching purposes, and each of said crosspoints is comprised of semiconductor switching means.

5. A switching network as set forth in claim 1 in which each of said matrices has a plurality of crosspoints, and each of said crosspoints is comprised of at least one J-FET switching device for closing and opening a communication path.

6. A switching network as set forth in claim 5 in which C-MOS drive means is connected to said J-FET switching device.

7. A switching network as set forth in claim 1 in which said plurality of groups of switching matrices in said fourth stage D comprises R groups.

8. A switching network as set forth in claim 7 in which the 1-P matrices in each group in said C-stage are arranged in consecutive pairs, and in which 1-P matrices in each of said R groups in said D-stage are arranged in consecutive pairs, and each consecutive pair in said C-stage is connected to a corresponding pair in each of said R groups to provide a switching system having an ordered pair arrangement.

9. A non-symmetric folded four-stage switching network comprising a first stage A having K groups of switching matrices, each group being comprised of 1-M matrices, a second stage B having K groups of switching matrices, each group in said second stage being comprised of 1-N matrices, the matrices of corresponding ones of said groups in said first and second stages A, B being interconnected, a third stage C having K groups of switching matrices, each group in said third stage C being comprised of 1-P matrices, the matrices of corresponding ones of said groups K in said second and third stages B, C being interconnected thereby providing a plurality K of ABC switching groups, and a fourth stage D comprising a plurality of switching matrices and each of said pairs of switching matrices in said D stage being connected to an associated plurality of junctors, each of which junctors has at least a first and a second port, one matrix of each pair associated with a plurality of junctors being connected to the first port of each of said junctors and the second matrix of a pair being connected to the second port of each of said associated plurality of junctors.

10. A non-symmetric folded four-stage switching network comprising a first stage A having K groups of switching matrices, each group being comprised of 1-M matrices, a second stage having K groups of switching matrices, each group in said second stage being comprised of 1-N matrices, the matrices of corresponding ones of said groups K in said first and second stages A, B being interconnected, a third stage having K groups of switching matrices, each group in said third stage C being comprised of 1-P matrices arranged as consecutive pairs, the matrices of corresponding ones of said groups K in said second and third stages being interconnected thereby providing a plurality of ABC switching groups, a fourth stage D comprising a plurality of switching matrices arranged in P/2 groups, one corresponding pair in each group in said C stage being interconnected with matrices in only one of said P/2 groups, and each of said switching matrices in said D stage being connected to an associated plurality of associated junctors to provide a folded matrix.

11. A switching network as set forth in claim 10 in which the switching matrices of each of said P2 groups are arranged in pairs, and in which said one corresponding pair in each group of said C stages is connected to each of said pairs in said one P/2 group.

12. A method of searching for an idle path between calling and called terminals in a four-stage folded ABC+D non-symmetric switching network having AB, BC and CD links and junctors comprising the steps of:
 a. searching the CD links for a pair of idle CD links which through the D-stage have an idle junctor accessible thereto and which may be connected to extend a path between the calling and called terminals;
 b. searching for a path from one of the idle CD links of the pair through the BC and AB links of the ABC stages to the calling terminal;
 c. closing the path to the calling terminal; and
 d. searching for a path from the other CD link of the pair through the BC and AB links of the ABC stages to the called terminal.

13. A method of path searching over a non-symmetric four-stage ABC + D folded switching network having a plurality of groups of ABC stages, each group including a plurality of A,B and C matrices and having AB, BC and CD links with C and D matrices being arranged in corresponding ordered pairs and ordered pair groups together with subgroups of junctors associated with D-stage ordered pairs for the purpose of providing an idle communication path between a calling terminal and a called terminal comprising the steps of:
 a. determining the ABC group identity and the A matrix identity within the ABC group for the calling terminal and for the called terminal;
 b. establishing the order in which coincident idle CD links in an ordered pair are to be tested;
 c. establishing the minimum number of idle junctors in a junctor sub-group required before a set of coincident idle CD links and idle junctors is selected for the desired communication path;
 d. checking for the existence of coindicent idle CD links and associated idle junctors in the first ordered pair group which is selected;
 e. selecting the lowest number junctor sub-group from those determined to be available;
 f. selecting one idle junctor from the idle junctors of the sub-group selected;

g. searching for an idle path to the calling terminal via the ABC stages from one of the coincident idle CD links associated with the selected junctor sub-group;

b. operating the appropriate crosspoints to establish connection between said one of the coincident idle CD links and the calling terminal;

i. searching for an idle path to the called terminal via the ABC stages from the other coincident idle CD link associated with the selected junctor sub-group, operating the appropriate crosspoints to establish a connection between the other CD link and the called terminal, and closing the path from the one CD link over the selected junctor to the other CD link.

14. A method of path searching over a non-symmetric four-stage ABC + D folded switching network having a plurality of groups of ABC switching stages and a D switching stage and having AB, BC, and CD links together with associated junctors for providing paths between associated terminals, and in which the C and D stages of said switching network are arranged in ordered pair groups of matrices and junctors, comprising the steps of determining the ABC group identities of the calling and called terminals, whereby the identities of the coincident CD link pairs within the ordered pair group which may be used in a desired connection are established; examining the availability in an ordered pair group of the coincident CD links which may be used in such connection and simultaneously examining the state of the junctors associated with such links for availability, and continuing such examination through successive ordered pair groups until an ordered pair group is found containing at least an available coincident CD link pair having available junctors.

15. The method as set forth in claim 14 in which the examination in an ordered pair group for available coincident CD link pairs having available junctors includes the steps of examining an ordered pair group for at least such a pair of links and having at least two available junctors associated therewith, continuing the search through successive ordered pair groups for an ordered pair group having a pair of links having two available junctors, and failing the location of an ordered pair group having a coincident available pair of links having two available junctors, making a further examination of ordered pair groups in a search for an ordered pair group having a coincident available pair of links having at least one available junctor.

16. A method as set forth in claim 14 in which each examination for an ordered pair group having an available coincident pair of idle CD links is started in the ordered pair group immediately following the ordered pair group in which the previous connection was made.

17. A method as set forth in claim 14 in which each examination in an ordered pair group comprises a search for a pair of coincident idle links in one combination of the ordered pair, and in the event of the failure to locate a pair in such ordered pair group, examining the same ordered pair group for such a pair in the other combination of the ordered pair.

18. A method of path searching over a non-symmetric four-stage ABC + D folded switching network having a plurality of groups of ABC stages, each group including a plurality of A,B, and C matrices and including AB, BC, CD links together with an appropriate junctor for the purpose of providing an idle communication path eligible for completing a connection between a calling terminal and a called terminal comprising the steps of determining identities of ABC group number identity and A matrix identity within the ABC group for the calling terminal and the called terminal, establishing the order in which coincident CD links in an ordered pair are to be tested, establishing the minimum number of idle junctors in a junctor subgroup required, searching an ordered pair group for the presence of idle coincident CD links for the desired communication path by searching sequentially from a start point for the first idle coincident CD link, checking for at least one idle junctor in the junctor row associated with the first idle coincident link, selecting the first idle junctor from the idle junctors in such row, searching for an idle path to the calling terminal via ABC stages from one of the CD links associated with the selected junctor, operating the appropriate crosspoints to establish connection between said one of the said CD links and the calling terminal, searching for an idle path to the called terminal via ABC stages from the other one of the CD links of the selected pair associated with the selected junctor, and operating the appropriate crosspoints to establish a connection between the other CD link and the called terminal.

19. A method of path searching over a non-symmetric four-stage ABC + D folded switching network having a plurality of groups of ABC stages, each group including a plurality of A,B, and C matrices and including AB, BC, CD links together with an appropriate junctor for the purpose of providing an idle communication path between a calling terminal and a called terminal comprising the steps of:

a. determining the identities of the ABC group number and the A matrix identity within the ABC group for the calling terminal and similarly for a called terminal;

b. establishing the order in which coincident CD links in an ordered pair are to be tested;

c. establishing the minimum number of idle junctors in a junctor sub-group required before the set of idle coincident CD links and idle junctors is selected for the desired communication path;

d. checking for the existence of idle coincident CD links in an ordered pair group;

e. if no idle coincident CD link pairs exist in the ordered pair group examined, continuing the search in successive ordered pair groups until an ordered pair group is found which contains an idle coincident CD link pair or until all ordered pair groups have been searched;

f. if the checking step indicates the existence of idle coincident links, locating the first idle pair of CD links in the ordered pair group;

g. checking for the existence of idle junctors associated with the selected set of idle coincident CD links;

h. selecting one of the idle junctors associated with the selected idle CD link pair;

i. in the event there exist no idle junctors which are associated with selected coincident idle CD links, continuing the search for an idle coincident pair of CD links within the same ordered pair group; and j. in the event no more idle coincident pairs of CD links exist in the examined order pair group, continuing the search in the next ordered pair group.

* * * * *